(12) United States Patent
Anan et al.

(10) Patent No.: US 8,571,212 B2
(45) Date of Patent: Oct. 29, 2013

(54) IMAGE ENCRYPTING DEVICE, IMAGE DECRYPTING DEVICE AND METHOD

(75) Inventors: Taizo Anan, Kawasaki (JP); Kensuke Kuraki, Kawasaki (JP); Shohei Nakagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/623,935

(22) Filed: Nov. 23, 2009

(65) Prior Publication Data

US 2010/0067706 A1    Mar. 18, 2010

Related U.S. Application Data

(63) Continuation of application No. PCT/JP2007/000581, filed on May 30, 2007.

(51) Int. Cl.
*H04L 29/06* (2006.01)

(52) U.S. Cl.
USPC .............................. 380/54; 380/243

(58) Field of Classification Search
USPC ........................... 380/54, 205–243
See application file for complete search history.

(56) References Cited

U.S. PATENT DOCUMENTS

| 5,491,563 | A * | 2/1996 | Pomerantz | 358/405 |
| 6,226,618 | B1 * | 5/2001 | Downs et al. | 705/51 |
| 6,839,844 | B1 | 1/2005 | Okano | |
| 2005/0244007 | A1 * | 11/2005 | Little et al. | 380/270 |

FOREIGN PATENT DOCUMENTS

| EP | 1750427 | 2/2007 | |
| JP | 58-009462 | 1/1983 | |
| JP | 3-40689 | 2/1991 | |
| JP | 07-074940 | 3/1995 | |
| JP | 2000-315998 | 11/2000 | |
| JP | 2002-341763 | 11/2002 | |
| JP | 2003-169047 | * | 6/2003 |
| JP | 2003-264543 | * | 9/2003 |
| JP | 2005-107802 | | 4/2005 |
| JP | 2006-74570 | | 3/2006 |
| JP | 2006-332826 | | 12/2006 |

(Continued)

OTHER PUBLICATIONS

Michiharu Niimi et al, A Near-Loss Image Compression by a Noise Measure Based Region Segmentation, Faculty of Engineering, Kyushu Institute of Technology, Japan, The Institute of Electronics, Information, and Communication Engineers.

(Continued)

*Primary Examiner* — Lisa Lewis
(74) *Attorney, Agent, or Firm* — Staas & Halsey LLP

(57) ABSTRACT

An encrypting device generates an encrypted image by converting an image of a specified region in an input image with an encryption key, by embedding information obtained by encrypting the encryption key with a public key pairing with the private key of a destination, and by performing pixel value conversion. Then, the encrypted image is transmitted to the destination as a printed matter or via a network. A decrypting device converts the encrypted image in the form of print data or electronic data into an image, and inputs it. Next, the decrypting device extracts a decryption key (the encryption key) from the image of the encryption region by executing a process reverse to that of the encrypting device for the encryption region of the converted encrypted image. Then, the decrypting device decrypts the original image of the encrypted region by using the decryption key, and restores the entire encrypted image.

24 Claims, 22 Drawing Sheets

(A)

(B)

(56) References Cited

FOREIGN PATENT DOCUMENTS

| | | |
|---|---|---|
| JP | 2007-60236 | 3/2007 |
| JP | 2007-88899 | 4/2007 |
| JP | 2006-332828 | 12/2008 |
| WO | 2008/053576 A1 | 5/2008 |

OTHER PUBLICATIONS

Japanese Office Action mailed Nov. 29, 2011 issued in corresponding Japanese Patent Application No. 2009-516075.

Taizo Anan et al., "Front Line of Research and Development: Watermarking Technologies for Security-Enhanced Printed Documents", *Fujitsu*, vol. 58, No. 3, May 10, 2007, pp. 183-187.

Chinese Office Action issued Aug. 28, 2012 in corresponding Chinese Patent Application No. 200780053113.6.

Extended European Search Report issued Oct. 11, 2012 in corresponding European Patent Application No. 07737237.3.

Chinese Office Action mailed Jan. 31, 2013 in corresponding Chinese Application No. 200780053113.6.

European Office Action mailed Jun. 28, 2013 in corresponding European Application No. 07797237.3-1903.

\* cited by examiner

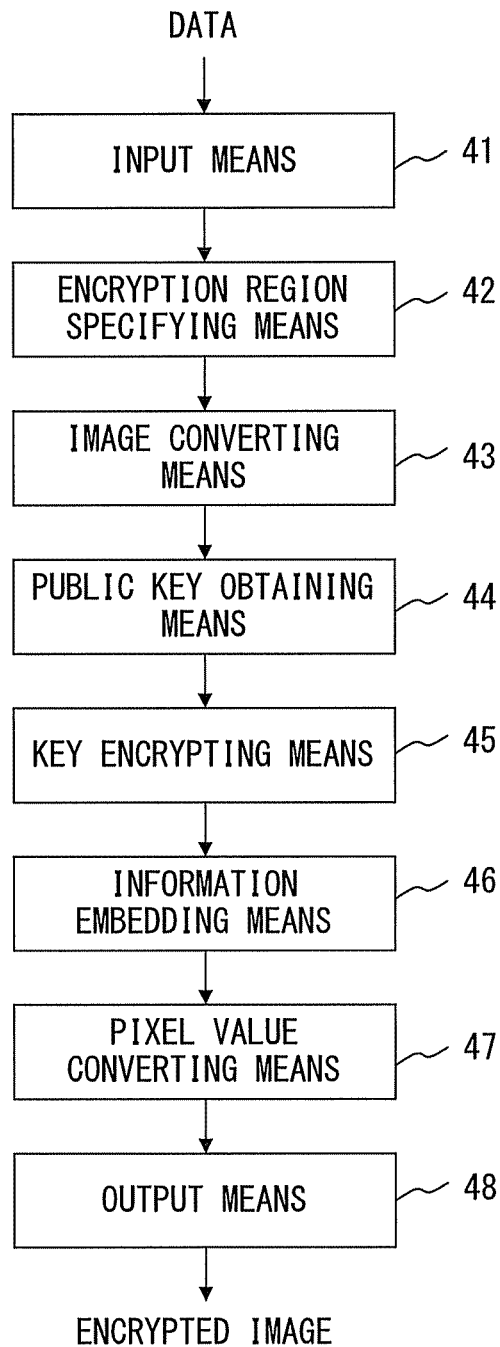
F I G. 2

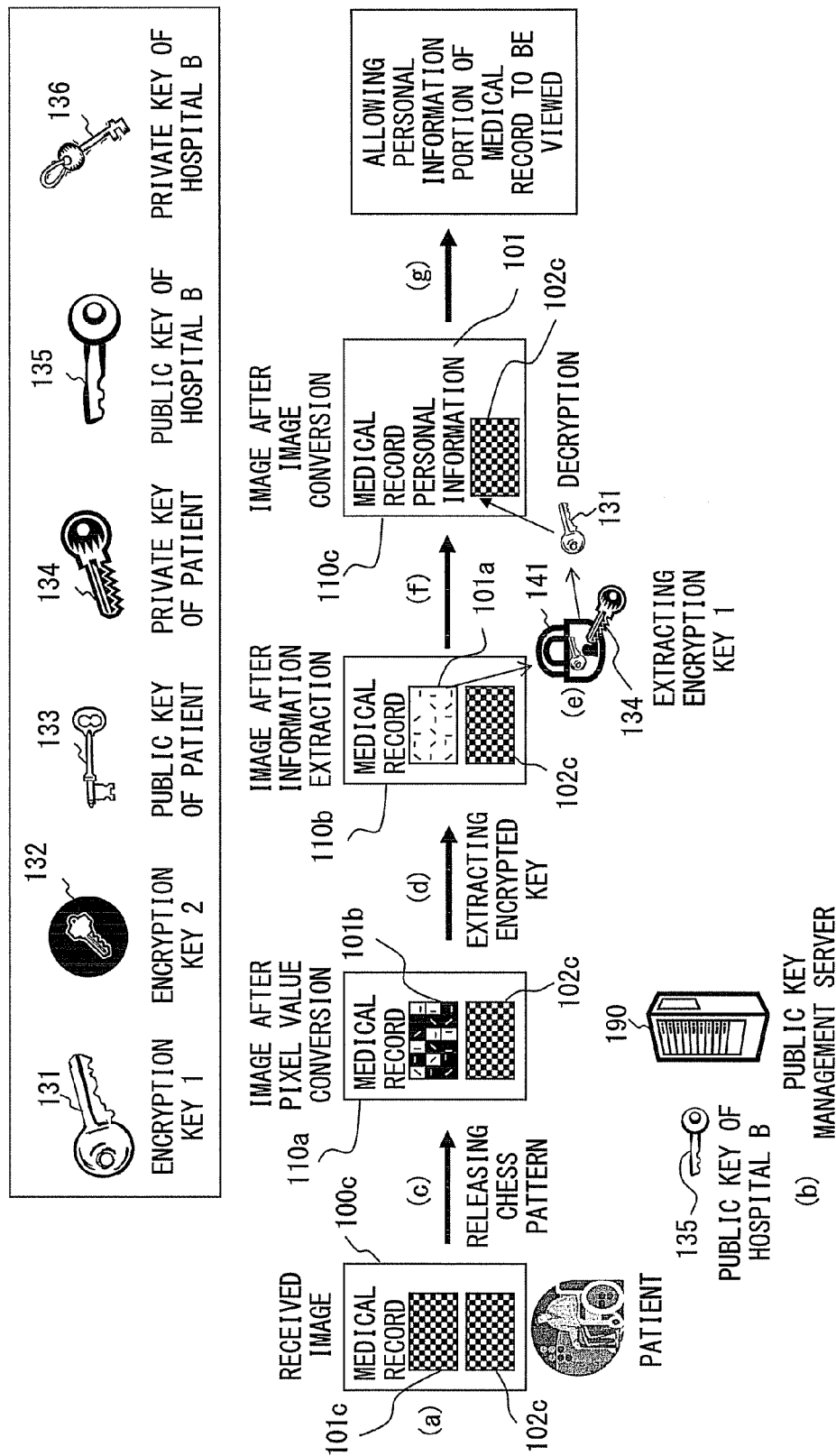
F I G. 6

IMAGE ENCRYPTING DEVICE, IMAGE DECRYPTING DEVICE AND METHOD

CROSS-REFERENCE TO RELATED APPLICATIONS

This application is a continuation application of International PCT Application No. PCT/JP2007/000581 which was filed on May 30, 2007.

FIELD

The present invention relates to a technique for safely exchanging a printed matter or electronic data, in which important information such as personal information, etc. is visually encrypted.

BACKGROUND

Leakage of secret information has become a serious problem with the progression of social informatization, and the importance of technology for preventing information leakage has been increasing. As the information leakage technology, for example, a technique of encrypting digital data without allowing a third party to learn the contents of the data even if the third party obtains the data was developed. This encryption technique is already used as effective means for preventing the information leakage of digital data.

In the meantime, technology for preventing the information leakage of a printed matter printed on a paper medium, etc. has not been sufficiently established, and has not been commercialized yet. Statistics proves that approximately one half of information leakage cases relate to printed matters in the contemporary society. Accordingly, there is an urgent need to develop technology for preventing the information leakage of a printed matter, similar to digital data.

Specific examples of printed matters, for which countermeasures against information leakage are desired to be taken, include a commodity purchase bill, a statement of a credit card, etc., a medical record of a hospital, a school report card, a list of names, etc. According to JP/2007/000215 (hereinafter referred to as Patent Document 1) filed as a PCT application, an image printed on paper as well as a digital image can be encrypted to prevent information leakage. A hospital medical record, a full statement, etc., which are printed on paper, can be defined as one type of visual information. Accordingly such items of information are collectively referred to as "images" in this specification.

Image encryption disclosed by Patent Document 1 is summarized.

Part of an input image 10 illustrated in FIG. 1(A) is specified as an encryption region 11, and an image of the encryption region 11 is encrypted with an encryption key. As a result, an encrypted image 20 illustrated in FIG. 1(B) is generated. In the encrypted image 20, a region 21 corresponding to the encryption region 11 is encrypted to be visually unreadable.

In the above described input image encryption, the encryption process itself is executed as a digital data process. Therefore, an encrypted image is digital data. This encrypted image may be thereafter printed on a paper medium, etc., or may be exchanged unchanged as digital data. The invention disclosed by Patent Document 1 is characterized in that an encrypted image once printed and converted into so-called analog digital data can be again decrypted.

The invention disclosed by Patent Document 1 adopts a common key (the same key) for image encryption and decryption. Therefore, a key to decrypt encrypted information must be separately transmitted to the transmission destination of the encrypted information. Accordingly, a third party can possibly steal the decryption key, leading to a problem in terms of security.

In the meantime, an electronic authentication system where a robust authentication server is constructed and used to safely exchange a common key has been already commercialized. However, the configuration of a system using such an authentication server is significantly different from that of a popularized simple authentication system intended for individual users. Therefore, users that can benefit from the technique of the invention disclosed by Patent Document 1 are restricted.

Patent Document 1: PCT/JP2007/000215

SUMMARY

An object of the present invention is to allow everybody to easily and safely exchange a common key used to decrypt an encrypted image generated with an encryption technique without changing an existing key management system.

An image encrypting device according to the present invention assumes an image encrypting device for encrypting an image.

A first embodiment of the image encrypting device according to the present invention includes input means, encryption region specifying means, image converting means, public key obtaining means, key encrypting means, information embedding means, pixel value converting means and output means.

The input means inputs image data to be encrypted. The encryption region specifying means specifies a region to be encrypted in the image data generated by the input means. The image converting means converts the encryption region, which is specified by the encryption region specifying means, into a first image by using an encryption key. The public key obtaining means obtains a public key of a transmission destination of the data to be encrypted. The key encrypting means encrypts the encryption key by using the public key obtained by the public key obtaining means. The information embedding means embeds encryption key associated information, which is information about the encryption key encrypted by the key encrypting means, in the first image to convert the encryption region into a second image. The pixel value converting means converts a pixel value of the second image to convert the encryption region into a third image so that the region specified by the encryption region specifying means is identifiable. The output means outputs the encrypted image, which is obtained by converting the image of the encryption region into the third image in the image input by the input means, in a predetermined method.

According to the first embodiment of the image encrypting device of the present invention, an encrypted image of data (information) in an encrypted region, in which encryption key associated information that is information about an encryption key is embedded, is generated and output. Therefore, a decryption key required to restore the encrypted image can be safely exchanged between the transmission source and the reception destination of the encrypted image. Moreover, the encryption key associated information is information about the encryption key encrypted with a public key of the reception destination of the encrypted image. Therefore, only a receiver of the encrypted image, who possesses a private key pairing with the public key can extract the decryption key (equal to the encryption key) from the encryption key associated information. Accordingly, even if a third party obtains the encrypted image, he or she cannot restore the image, and contents of the image-encrypted information are prevented from leaking to the third party.

A second embodiment of the image encrypting device according to the present invention assumes the above described first embodiment of the image encrypting device of the present invention, and the encryption region specifying means specifies a plurality of encryption regions. The image converting means converts images of the plurality of encryption regions individually by using a plurality of encryption keys. The public key obtaining means obtains a plurality of public keys. The key encrypting means encrypts the plurality of encryption keys, which the image converting means uses to convert the images of the plurality of encryption regions, individually by using the plurality of public keys obtained by the public key obtaining means.

According to the second embodiment of the image encrypting device of the present invention, a plurality of pieces of information can be image-encrypted, for example, for one document. Accordingly, the second embodiment is effective at encrypting a document where information pieces desired to be encrypted scatter.

A third embodiment of the image encrypting device according to the present invention assumes the above described second embodiment of the image encrypting device of the present invention, and the image converting means converts the images of the plurality of encryption regions individually by using separate encryption keys.

According to the third embodiment of the image encrypting device of the present invention, each encryption region, namely, an image of each information piece is encrypted by using an individual encryption key, thereby improving the degree of security.

A fourth embodiment of the image encrypting device according to the present invention assumes the above described second or third embodiment of the image encrypting device, and the plurality of public keys obtained by the public key obtaining means are public keys of a plurality of transmission destinations.

A fifth embodiment of the image encrypting device according to the present invention assumes any one of the above described second to the fourth embodiments of the image encrypting device, and the public key obtaining means obtains public keys the number of which is equal to that of the plurality of encryption regions.

A sixth embodiment of the image encrypting device of the present invention assumes the above described first or second embodiment of the image encrypting device, and the output means outputs the encrypted image after being encrypted with the public key of the transmission destination.

A seventh embodiment of the image encrypting device according to the present invention assumes the above described first or second embodiment of the image encrypting device of the present invention, and the key encrypting means encrypts the encryption key by using the public key, and a private key of another party to which the transmission destination submits the encrypted image.

An eighth embodiment of the image encrypting device according to the present invention assumes the above described first or second embodiment of the image encrypting device, and the input means inputs the encryption key.

A ninth embodiment of the image encrypting device according to the present invention assumes any one of the above described first to eighth embodiments of the image encrypting device, and the public key obtaining means obtains a public key from a public key management server that manages the public key.

In any one of the first to the ninth embodiments of the image encrypting device according to the present invention, the output means may be configured to print and output the encrypted image. Or, the output means may be configured to convert the encrypted image into another format and to output the image. Alternatively, the output means may be configured to transmit the encrypted image via a network. In this network transmission, the encrypted image may be transmitted, for example, by electronic mail.

An image decrypting device according to the present invention assumes an image decrypting device for decrypting an encrypted image including an image encrypted into an original image.

A first embodiment of the image decrypting device according to the present invention includes input means, encryption position detecting means, pixel value converting means, information extracting means, key decrypting means and image converting means.

The input means inputs the encrypted image as image data. The encryption position detecting means detects the position of an encryption region that is a region, in which an image is encrypted in the encrypted image, by analyzing the encrypted image input by the input means. The pixel value converting means restores a pixel value of the image in the encryption region to a pixel value before being converted in order to identify the position of the encryption region on the basis of information about the position of the encryption region, which is detected by the encryption position detecting means. The information extracting means extracts encryption key associated information, which is information about an encryption key embedded in the image of the encryption region, from the image of the encryption region generated by the pixel value converting means. The key decrypting means decrypts a decryption key, which is used to decrypt the image of the encryption region, from the encryption key associated information by using a first private key pairing with a first public key used to generate the encryption key associated information extracted by the information extracting means. The image converting means decrypts the original image by decrypting the image of the encryption region by using the decryption key decrypted by the key decrypting means.

According to the first embodiment of the image decrypting device of the present invention, a decryption key required only to decrypt an image of an encryption region is extracted from an encrypted image, which can be restored to an original image.

A second embodiment of the image decrypting device according to the present invention assumes the above described first embodiment of the image decrypting device, and the first private key is a private key that is possessed by a transmission destination of the encrypted image and pairs with a second public key used by another party, to which the transmission destination submits the encrypted image, to decrypt the encrypted image.

According to the second embodiment of the image decrypting device of the present invention, an encrypted image encrypted with a private key possessed by a transmission destination can be restored to an original image.

A third embodiment of the image decrypting device according to the present invention assumes the above described first or second embodiment of the image decrypting device, and the image decrypting device further comprises public key obtaining means for obtaining a public key to obtain a second public key pairing with a second private key, if the encryption key associated information is encrypted with the first public key and the second private key. Moreover, the key encrypting means decrypts the decryption key from the encryption key associated information by using the first private key and the second public key.

According to the third embodiment of the image decrypting device of the present invention, encryption key associated information, which is obtained by encrypting an encryption key used to encrypt an image of an encryption region by using a first public key and a second private key, is extracted from an encrypted image, and the encryption key (equal to a decryption key) can be extracted from the encryption key associated information. Then, the encrypted image can be restored to the original image by using the decryption key.

A fourth embodiment of the image decrypting device according to the present invention assumes the above described first or second embodiment of the image decrypting device, and the encryption region is a plurality of encryption regions.

According to the fourth embodiment of the image decrypting device of the present invention, an encrypted image including the plurality of encryption regions can be restored to an original image.

A fifth embodiment of the image decrypting device according to the present invention assumes the above described fourth embodiment of the image decrypting device, and each piece of encryption key associated information, which is included in an image of each of the plurality of encryption regions, is information about an individual encryption key. The information extracting means extracts an individual piece of the encryption key associated information from each of the plurality of encryption regions. Moreover, the key decrypting means decrypts, from each piece of the encryption key associated information extracted by the information extracting means, each decryption key used to decrypt the image of each of the plurality of encryption regions, in which each piece of the encryption key associated information is embedded, by using a public key pairing with a private key used to generate each piece of the encryption key associated information.

According to the fifth embodiment of the image decrypting device of the present invention, an encrypted image, in which a plurality of encryption regions are encrypted with individual encryption keys, can be restored to an original image.

A sixth embodiment of the image decrypting device according to the present invention assumes the above described fifth embodiment of the image decrypting device. Each piece of the encryption key associated information is generated with an individual private key.

According to the sixth embodiment of the image decrypting device of the present invention, an encrypted image in which embedded encrypted key associated information is generated with an individual private key can be restored to an original image.

A seventh embodiment of the image decrypting device according to the present invention assumes any one of the above described first to fifth embodiments of the image decrypting device, and the public key obtaining means obtains the public key from a public key management server that manages the public key.

In the image decrypting device according to any one of the above described first to seventh embodiments, the encrypted image is, for example, an image printed in a printed matter, an image in a predetermined format, etc. Moreover, the encrypted image may be received via a network. In this network reception, the encrypted image is received, for example, by electronic mail.

In the image decrypting device configured as described above, the encrypted image may be an image generated by the above described image encrypting device.

According to the present invention, a common key (an encryption key and a decryption key), which is used for encryption and decryption of an encrypted image, can be exchanged by being embedded in the encrypted image. Accordingly, the common key can be safely exchanged in the form of an encrypted image without introducing a popularized authentication system including an authentication server, etc. when important information such as personal information, etc., which is required to be highly secret, is image-encrypted and exchanged in the form of an encrypted image. In this case, the encrypted image can be printed on a paper medium, and both of the important information and the common key can be exchanged with the printed matter while retaining high security without being tapped by a third party. Moreover, the common key is encrypted with the public key of a transmission destination, and encryption key associated information obtained with the encryption is embedded in the encrypted image, whereby the mechanism of the encryption and personal authentication can be expanded to a paper medium. According to the present invention, the encrypted image in which the encryption key associated information is embedded can be exchanged via a network, a recording medium, etc. in the form of electronic data as a matter of course.

BRIEF DESCRIPTION OF DRAWINGS

FIG. 2 illustrates a basic configuration of an image encrypting device according to the present invention;

FIG. 6 illustrates a configuration and a method (No. 2) of the second embodiment of the application system to which the present invention is applied;

DESCRIPTION OF EMBODIMENTS

Figure 1:
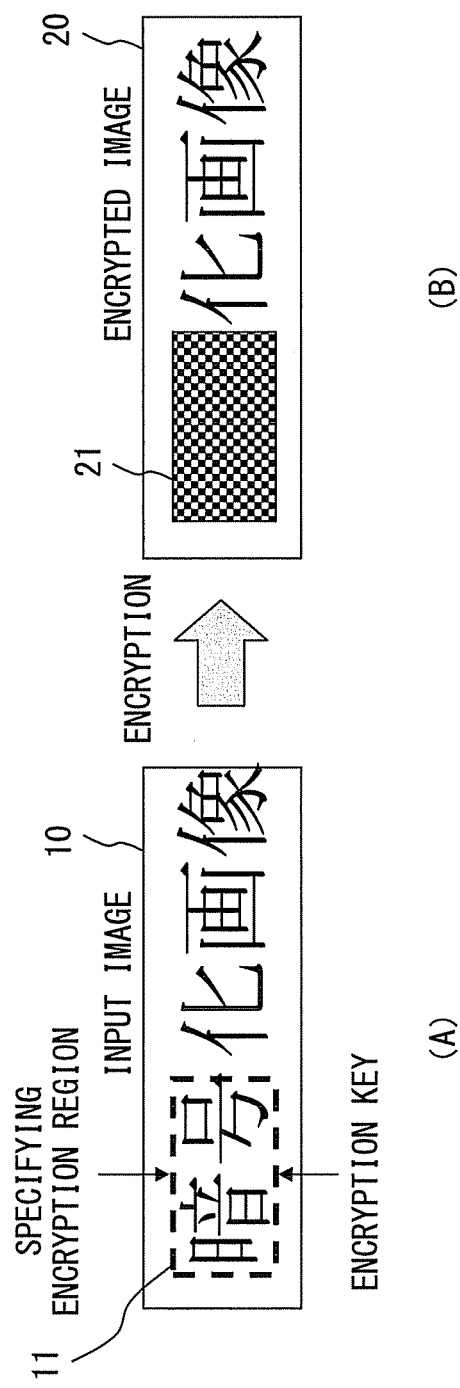
FIG. 1 illustrates one example of image encryption.

Embodiments according to the present invention are described below with reference to the drawings.

A basic configuration of an image encrypting device according to the present invention is initially described.

{Basic Configuration of the Image Encrypting Device According to the Present Invention}

FIG. 2 illustrates the basic configuration of the image encrypting device according to the present invention.

The image encrypting device 40 according to the present invention includes input means 41, encryption region specifying means 42, image converting means 43, public key obtaining means 44, key encrypting means 45, information embedding means 46, pixel value converting means 47 and output means 48.

The input means 41 inputs data to be encrypted, and converts the data into an image (hereinafter referred to as an input image). The input image is, for example, an image in a bitmap format. Data input to the input means 41 is, for example, document data created with software of a word processor, PDF (Portable Document Format) data, HTML (Hyper Text Transfer Protocol) data, or the like. The input means 41 converts part or the whole of such data into an image in a bitmap format, etc. (image data). The data input to the input means 41 may be the image data of a printed matter read with a scanner, etc.

The input means 41 also inputs an encryption key used to encrypt part of the above described image. This encryption key may be, for example, a password input via a GUI (Graphical User Interface), a key stored in an ID card, or biometric information such as a fingerprint, a vein, an iris, etc., which is used when a biometric authentication apparatus performs authentication.

The encryption region specifying means 42 specifies part of the image output from the input means 41, namely, a region desired to be encrypted in the image. The specification of the encryption region is made, for example, via a GUI. If the image is data in a fixed format, the encryption region may be specified with coordinate information, etc. in advance. The number of encryption regions to be specified is not limited to one and may be plural.

The image converting means 43 encrypts the region (encryption region), which is specified by the encryption region specifying means 42, in the image output from the input means 41 with the encryption key input via the input means 41. This encryption is made, for example, by the technique disclosed by the invention of the above described Patent Document 1. As a result of this encryption, contents of the original image of the encryption region in the input image become unrecognizable.

The public key obtaining means 44 obtains the public key of a transmission destination of the encrypted input image (hereinafter referred to as an encrypted image) from an existing server holding the public key via a network, etc.

The key encrypting means 45 encrypts the encryption key, which is input to the input means 41, by using the public key obtained by the public key obtaining means 44. The encryption key encrypted with the public key in this way cannot be decrypted without using the private key of the transmission destination. Accordingly, even if a third party taps the encryption key encrypted with the public key, he or she cannot decrypt the encryption key. Therefore, the image of the encryption region within the encrypted image cannot be read although the encryption key encrypted with the public key is embedded in the encrypted image and transmitted.

The information embedding means 46 embeds the encryption key encrypted by the key encrypting means 45 in the encrypted image generated by the image converting means 43 as image information.

The pixel value converting means 47 converts pixel values at certain cycles in the horizontal and the vertical directions of the image, for example, with the technique of the invention disclosed by the above described Patent Document 1, and generates an image of an almost striped pattern.

The output means 48 outputs the image (referred to as a finally encrypted image for the sake of convenience), which is generated by the pixel value converting means 47, to a printing device, an image display device or a network, or stores the finally encrypted image in a storage device, etc. This storage may be made not by leaving the finally encrypted image unchanged but by converting the finally encrypted image into another format such as PostScript data, a PDF file, etc.

{Basic Configuration of an Image Decrypting Device According to the Present Invention}

Figure 3:
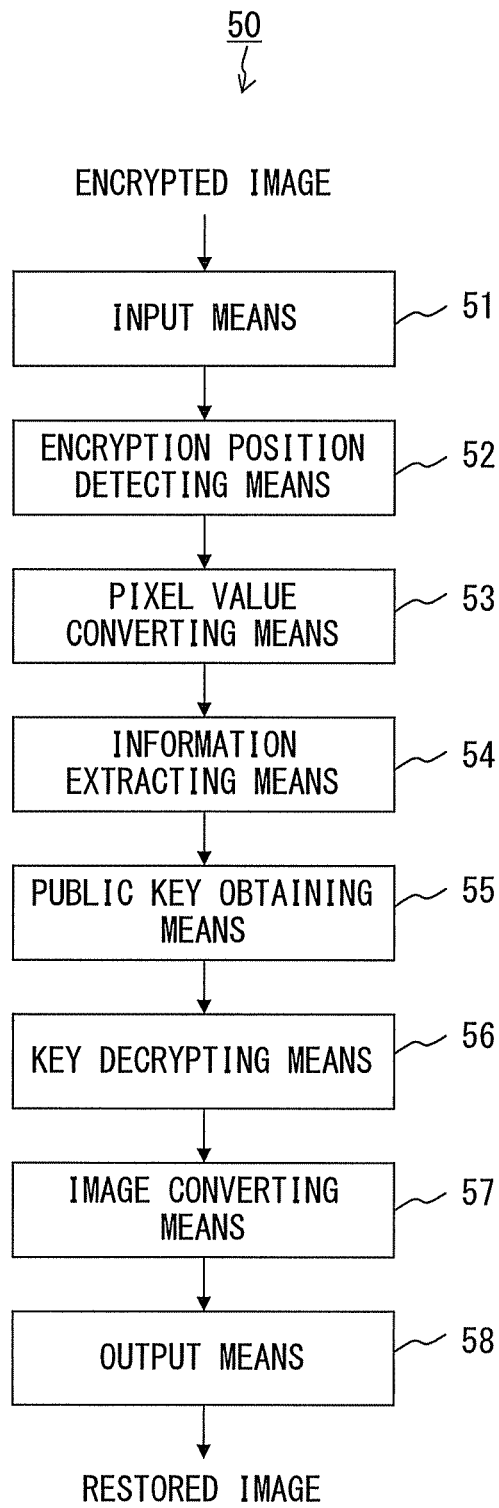
FIG. 3 illustrates a basic configuration of an image decrypting device according to the present invention.

FIG. 3 is a basic configuration of the image decrypting device according to the present invention.

The image decrypting device 50 according to the present invention includes input means 51, encryption position detecting means 52, pixel value converting means 53, information extracting means 54, public key obtaining means 55, key decrypting means 56, image converting means 57 and output means 58. However, the public key obtaining means 55 is not always essential. The public key obtaining means 55 is required only when encryption key associated information embedded in an encrypted image to be decrypted is generated with a public key at the side of generating the encrypted image, and a private key at the side of decrypting the encrypted image. In this case, the public key obtaining means 55 obtains the public key pairing with the private key.

The image encrypting device 50 according to the present invention restores the finally encrypted image, which is generated by the above described image encrypting device 40, to the original image (image input to the input means 41).

The input means 51 inputs the finally encrypted image generated by the image encrypting device 40.

The finally encrypted image input to the input means 51 may be a finally encrypted image obtained by reading the image data of a printed matter, which is printed after being encrypted by the image encrypting device 40, with a scanner, etc.

The encryption position detecting means 52 detects the position of an encryption region within the finally encrypted image. If the finally encrypted image is generated with the technique of the invention disclosed by the above described Patent Document 1, the encryption position detecting means 52 also detects the position of a boundary line within the encryption region. This detection is made with the technique of the invention disclosed by Patent Document 1.

The pixel value converting means 53 executes a conversion process reverse to the pixel value conversion process executed by the pixel value converting means 47 of the image encrypting device 40, and releases the pixel values of the encryption region detected by the encryption position detecting means 52 (restores to the original pixel values).

The information extracting means 54 executes a process reverse to the process, which is executed by the information embedding means 46 of the image encrypting device 40 for the image restored by the pixel value converting means 47, and extracts the information of the encryption key (referred to as encryption key information for the sake of convenience), which is encrypted with the public key, from the restored image.

The public key obtaining means 55 obtains the public key when needed. The obtainment of the public key is made from a server that manages the public key, for example, similar to the public key obtaining means 44 of the image encrypting device 40. This public key is that used by a user who generates the finally encrypted image input to the input means 51 in order to generate encryption key information by encrypting the encryption key.

The key decrypting means 56 decrypts and extracts the encryption key from the encryption key information, which is extracted by the information extracting means 54, with the use of the private key pairing with the public key that the key encrypting means 45 of the image encrypting device 40 uses to encrypt the encryption key.

The image converting means 57 restores the image of the encryption region in the input image, which is encrypted by the image encrypting device 40, with the use of the encryption key extracted by the key decrypting means 56, and restores the entire input image.

The output means 58 outputs the input image restored by the image converting means 57 to a printing device, an image display device, etc.

As a result of this output, the image of the encryption region in the input image encrypted by the image encrypting device 40 can be recognized.

Only a user who holds the private key pairing with the public key used to generate the encryption key information embedded in the finally encrypted image can restore the image of the encryption region in the input image from the finally encrypted image generated by the image encrypting device 40.

Accordingly, by only transmitting the printed matter or the electronic data of the input image, in which the encryption key information is embedded, to a transmission destination, the transmission destination can restore the image of the encryption region in the input image with the use of the private key pairing with the public key, and can learn important information that is the image of the encryption region.

By taking advantage of the image encrypting device 40 and the image decrypting device 50 according to the present invention as described above, an encryption key (common key) used to encrypt important information within an input image, which is desired to be secret to a third party, can be safely encrypted with the scheme of a public key cryptosystem, and the important information within the input image can be safely exchanged between legitimate transmitter and receiver without exchanging the encryption key with means other than an input image.

Embodiments of an application system to which the image encrypting device and the image decrypting device according to the present invention are applied (hereinafter referred to simply as an application system), are described next.

First Embodiment of the Application System

Figure 4:
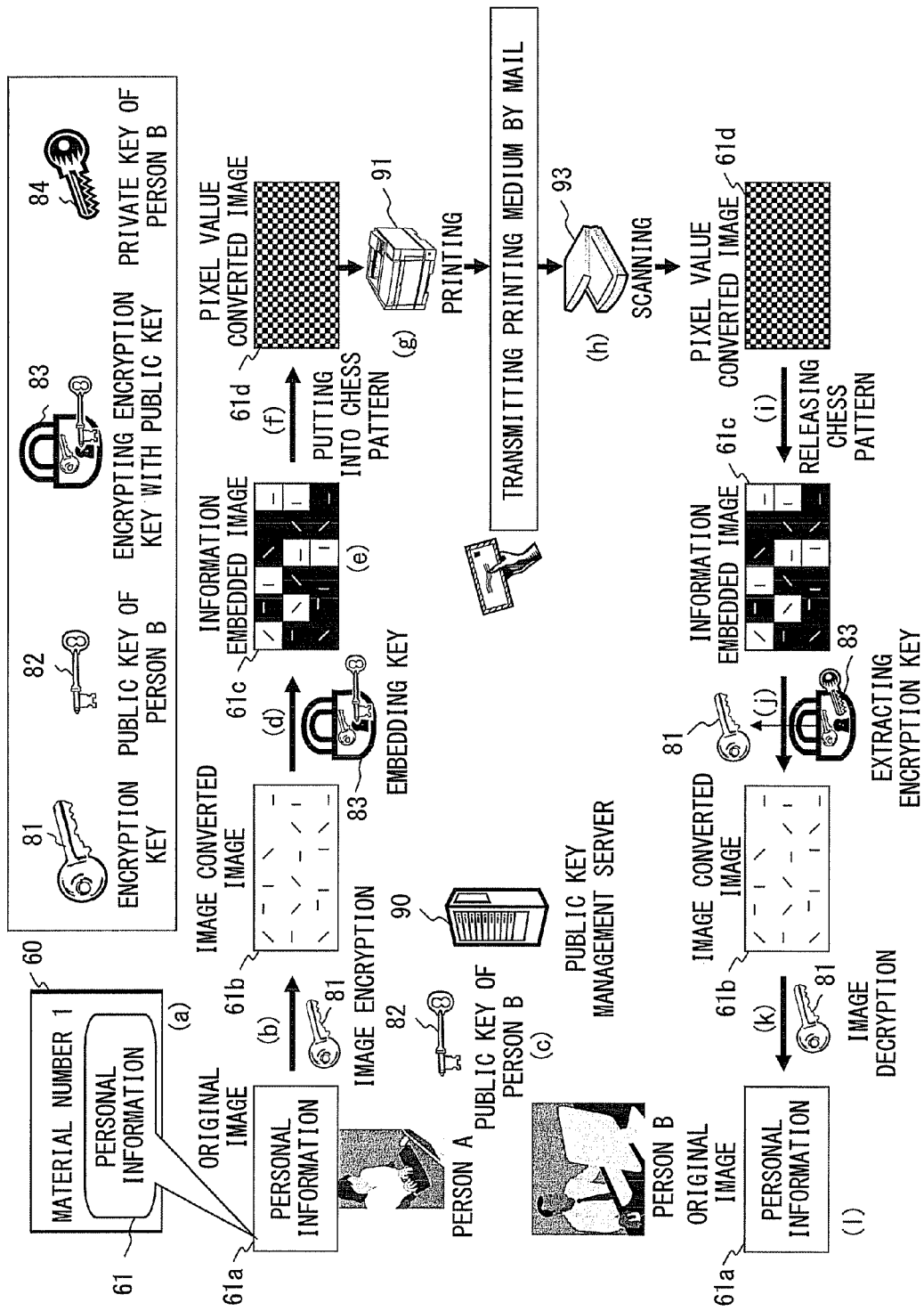
FIG. 4 illustrates a configuration of a first embodiment of an application system to which the present invention is applied.

A first embodiment of the application system according to the present invention is a system suitable for exchanging important information by using a printed matter as a medium. FIG. 4 illustrates a system configuration of the first embodiment according to the present invention.

The configuration and the operations of the system according to the first embodiment are described with reference to FIG. 4.

In this embodiment, a person A executes the following processes (a) to (g) by using the image encrypting device according to the present invention.

(a) Assume that the person A prints a material (document) 60 illustrated in FIG. 4(*a*) and transmits the printed matter to a person B by postal mail. Also assume that the material 60 includes a personal information list 61 desired not to be viewed by a third party.

(b) In this case, the person A initially reads the material 60 as an image with the input means 41 such as a scanner, etc. connected to a personal computer (PC), and captures the read image into a memory within the personal computer. Then, the person A makes the image visible on the display of the personal computer (PC). The person A specifies an image portion of the personal information list 61 as an "encryption region" on the screen of the display with the encryption region specifying means 42 such as a mouse, etc. Then, the person A encrypts the image 61*a* of the personal information list 61 (hereinafter referred to as a personal information list image 61*a*), which is specified as the encryption region, by using an encryption key 81 with the image converting means 43. This encryption is made, for example, with the technique of the invention disclosed by the above described Patent Document 1. As a result of this encryption, the personal information list image 61*a* is converted into an image converted image 61*b*.

(c) The person A obtains a public key 82 of a person B from a public key management server 90 with the public key obtaining means 44.

(d) The person A encrypts the encryption key 81 by using the public key 82 of the person B with the key encrypting means 45. The encrypted data generated with this encryption is referred to as encryption key associated information 83 for the sake of convenience.

(e) The person A embeds the encryption key associated information 83 in the encryption region of the image converted image 61*b* with the information embedding means 46 to generate an information embedded image 61*c*.

(f) The person A generates a pixel value converted image 61*d* by executing a pixel value conversion process for the information embedded image 61*c* with the pixel value converting means 47. This pixel value conversion process is, for example, a process for putting the information embedded image 61*c* into a chess pattern.

(g) The person A prints the material, in which the portion of the personal information list image 61*a* is converted into the pixel value converted image 61*d*, on paper with a printer 91. Then, the person A transmits the printed matter (printing medium), which is printed and output from the printer 91, to the person B by postal mail. The person B executes the following processes (h) to (l) by using the image decrypting device according to the present invention.

(h) Upon receipt of the printed matter transmitted from the person A by mail, the person B captures the print information of the printed matter as an image with a scanner 93 that is the input means 51. Since this image is almost the same as the pixel value converted image 61*d* created by the person A, this image is referred to as a pixel value converted image 61*d* for the sake of convenience.

(i) The person B releases the pixel value conversion process (the process for putting into a chess pattern) executed by the pixel value converting means 53 for the pixel value converted image 61*d* to restore the information embedded image 61*c* from the pixel value converted image 61*d*.

(j) The person B extracts the encryption key associated information 83 from the information embedded image 61*c* with the information extracting means 54. Then, the encryption key 81 is decrypted from the encryption key associated information 83 with a private key 84 of the person B. In the process of extracting the encryption key 81, the image converted image 61*b* is restored from the information embedded image 61*c*.

(k) The person B releases the image converted image 61*b* from being scrambled by using the encryption key 81 with the image converting means 57.

(l) By releasing the image from being scrambled as described above, the personal information list image 61*a* is restored from the image converted image 61*b*.

The above described processes (i) to (l) are executed, for example, by a personal computer possessed by the person B, and the restored personal information list image 61*a* is displayed on the display of the personal computer of the person B.

In this way, the person B can restore the image-encrypted personal information list from the printed matter transmitted by the person A by postal mail.

In the system according to the first embodiment, the personal information list of the material transmitted from the person A to the person B is image-encrypted with the encryption key 81, which is encrypted with the public key 82 and embedded in the information embedded image 61*c* as the encryption key associated information 83. Accordingly, even if a third party obtains the printed matter of the pixel value converted image 61*d* while the printed matter is being transmitted from the person A to the person B by mail, it is difficult for the third party to decrypt the personal information list, and he or she cannot learn the contents of the personal information list.

Second Embodiment of the Application System

The above described first embodiment is the example where the present invention is applied to the image encryption of a printed matter. In the first embodiment, only one region in the image of a material is encrypted.

According to the second embodiment of the application system to which the image encrypting device and the image decrypting device according to the present invention are applied, a plurality of regions in an image are encrypted. In this encryption, an image of each of the regions is encrypted with an individual encryption key. Then, the encryption key used to encrypt each of the regions is encrypted with an individual public key, and encryption key associated information obtained with this encryption is embedded in the image where each of the regions is encrypted.

FIGS. 5 to 8 illustrate a configuration and a method of the second embodiment of the application system according to the present invention.

The second embodiment is a system where the present invention is applied to image encryption of a medical record of a hospital. In the system according to this embodiment, a hospital A manages medical records of patients. Assume that a patient of the hospital A is permitted to view his or her own medical record on the Web (World Wide Web). Accordingly, the patient of the hospital A can download his or her own medical record held in the hospital A into a personal computer, etc. by using an Internet browser. Here, assume that the hospital A desires to permit the submission of the medical record of the hospital A to a second opinion doctor in another hospital (assumed to be a hospital B here) selected by the patient. Also assume that the hospital A desires to allow the medical record to be submitted also on paper. Further assume that the medical record of the hospital A includes information that is desired not to be viewed by the patient and required to be viewed by the doctor in the hospital B. Here, it is essential to prevent the information of the medical record of the hospital A from leaking in terms of personal information protection.

The system according to this embodiment based on the above described assumptions is described with reference to FIGS. 5 to 8.

<Process by the Hospital A>

Figure 5:
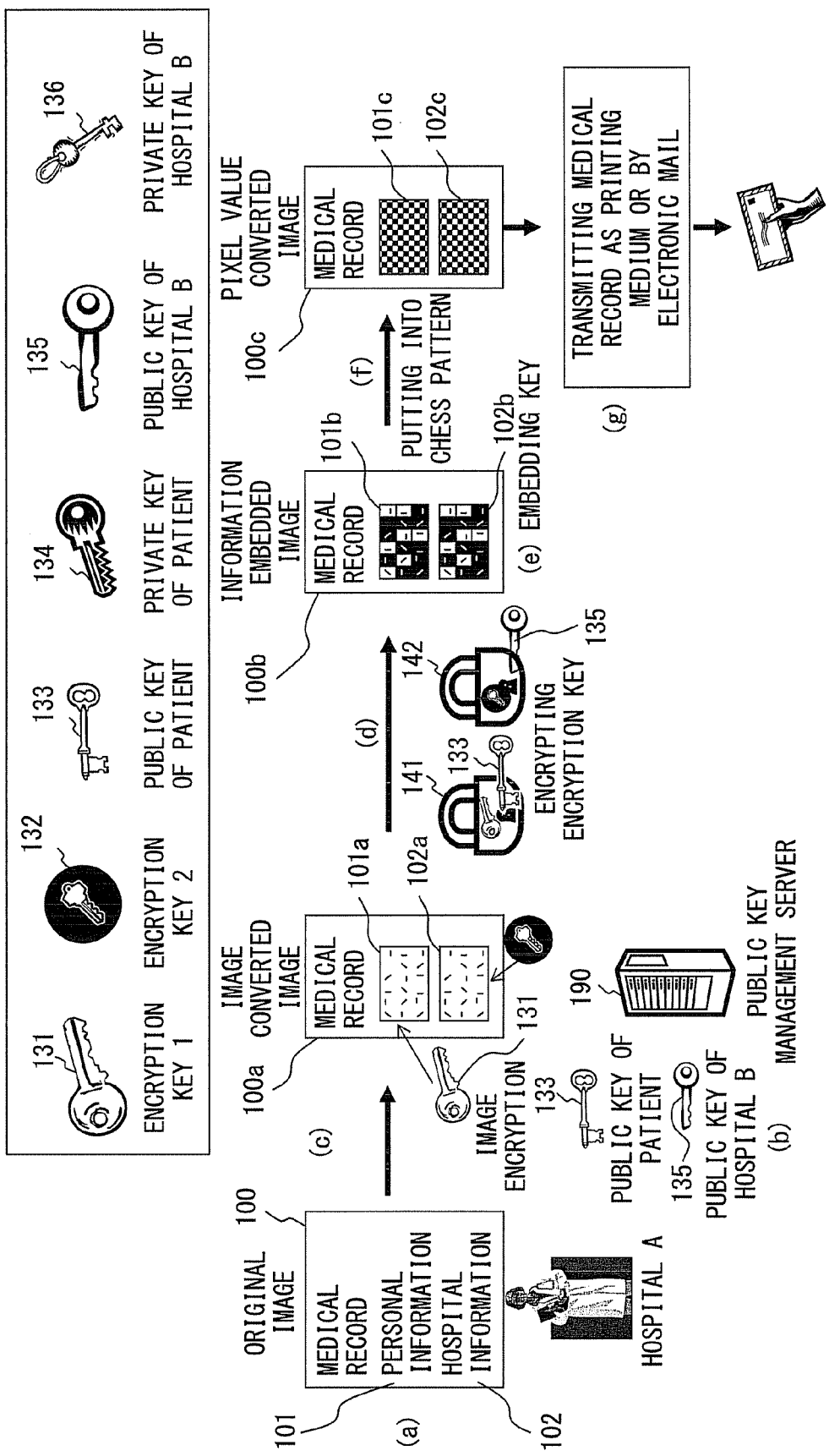
FIG. 5 illustrates a configuration and a method (No. 1) of a second embodiment of the application system to which the present invention is applied.
Figure 7:
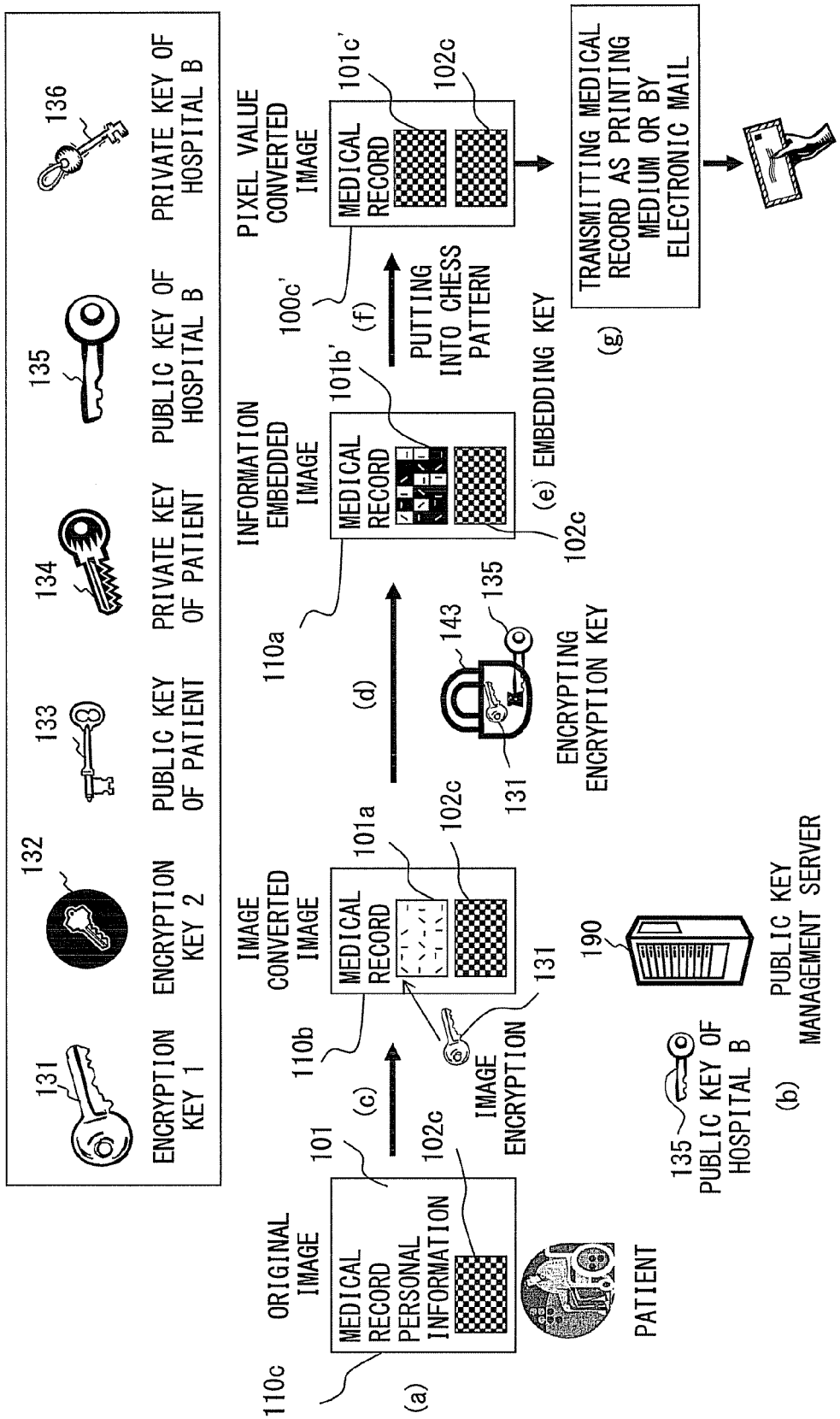
FIG. 7 illustrates a configuration and a method (No. 3) of the second embodiment of the application system to which the present invention is applied.

FIG. 5 is initially described. FIG. 5 illustrates process procedures executed at the side of the hospital A. The hospital A executes the following processes (a) to (g) by using the image encrypting device according to the present invention.

(a) The hospital A puts the medical record of the patient into an image to generate an original image 100 of the medical record (hereinafter referred to as a medical record original image 100). The medical record original image 100 includes an image 101 of personal information of the patient (hereinafter referred to as a patient personal information image 101), and an image 102 of hospital information (hereinafter referred to as a hospital information image 102) including the diagnostic results of the patient, and the like. The medical record original image 100 is generated by the input means 41.

(b) The hospital A obtains a public key 133 (first public key) of the patient, and a public key 135 (second public key) of the hospital B from a public key management server 190. The obtainment of these public keys is made by the public key obtaining means 44.

(c) In the medical record original image 100, the patient personal information image 101 (permitted to be viewed by the patient) is encrypted with an encryption key (common key) 131 (first encryption key), and the hospital information image 102 (desired not to be viewed by the patient and required to be viewed by the doctor in the hospital B) is encrypted with an encryption key (common key) 132 (second encryption key). As a result, an image converted image 100*a* that is the image obtained by encrypting the two partial images such as the patient personal information image 101 and the hospital information image 102 is generated from the medical record original image 100. The generation of the image converted image 100*a* is made by the image converting means 43. Here, the encrypted patient personal information image 101 and the encrypted hospital information image 102 within the image converted image 100*a* are referred to as a patient personal information encrypted image 101*a* and a hospital information encrypted image 102*a*, respectively. The image converted image 100*a* is generated by the image converting means 43.

(d) Since the encryption key 131 is permitted to be viewed by the patient, it is encrypted with a public key 133 of the patient. In contrast, the encryption key 132 is desired not to be viewed by the patient, it is encrypted with a public key 135 of the hospital B. These encryptions are made by the key encrypting means 45.

(e) Then, an information embedded image 100*b* is generated by embedding information about the encryption key 131 encrypted with the public key 133 of the patient (first encryption key associated information 141), and information about the encryption key 132 encrypted with the public key 135 of the hospital B (second encryption key associated information 142) respectively in the patient personal information encrypted image 101*a* and the hospital information encrypted image 102*a* of the image converted image 100*a*. Here, the patient personal information encrypted image 101*a* in which the first encryption key associated information 142 is embedded, and the hospital information encrypted image 102*a* in which the second encryption key associated information 142 is embedded are referred to as a patient personal information embedded image 101*b* and a hospital information embedded image 102*b*, respectively.

The generation of the information embedded image 100*b* is made by the information embedding means 46.

(f) A pixel value conversion process for putting the patient personal information embedded image 101*b* and the hospital information embedded image 102*b* into a chess pattern is executed for the information embedded image 100*b* to generate a pixel value converted image 100*c*. Here, the patient personal information embedded image 101*b* and the hospital information embedded image 102*b*, which are put into a chess pattern, in the pixel value converted image 100*c* are referred to as a patient personal information pixel value converted image 101*c* and a hospital information pixel value converted image 102*c*, respectively. The generation of the pixel value converted image 100*c* is made by the pixel value converting means 47.

(g) The pixel value converted image 100*c* is printed on a printing medium such as paper, etc. with a printer, etc., and the printing medium is transmitted to the patient and the hospital B by postal mail, or the pixel value converted image 100*c* is transmitted to the patient and the hospital B by electronic mail.

In this way, the hospital A can generate the image of the medical record (hereinafter referred to as a medical record encrypted image) including the encryption region that can be decrypted only by the patient and the encryption region that can be decrypted only by the hospital B, and can transmit the image to the patient and the hospital B.

<Medical Record Decryption Process by the Patient>

A process executed by the patient of the hospital A, who receives the pixel value converted image 100*c* from the hospital A, is described next with reference to FIG. 6. FIG. 6 illustrates process procedures for decrypting the patient personal information image 101 from the pixel value converted image 100*c* that the patient receives from the hospital A.

The patient of the hospital A (hereinafter referred to simply as the patient) executes the following processes (a) to (g) by using the image decrypting device according to the present invention.

(a) The patient who receives the printing medium, on which the medical record encrypted image is printed, from the hospital A converts the information printed on the printing medium into an image. As a result of this conversion, the pixel value converted image 100*c* generated by the hospital A can be obtained. The conversion from the printing information into the image is performed by the input means 51. If the patient receives the medical record encrypted image from the hospital A by electronic mail, he or she obtains the pixel value converted image 100*c* by opening the medical record encrypted image attached to the electronic mail. This obtainment is made by the input means 51.

(b) The pixel value conversion (putting into a chess pattern) is executed for the patient personal information pixel value converted image 101*c* within the pixel value converted image 100*c* is released. As a result, the patient personal information embedded image 101*b* is restored from the patient personal information pixel value converted image 101*c*. The release of the pixel value conversion of the patient personal information pixel value converted image 101*c* is made by the pixel value converting means 53. In this way, an image 110*a* including the patient personal information embedded image 101*b* and the hospital information pixel value converted image 102*c* can be obtained.

(c) The information 141 (first encryption key associated information 141) about the encryption key 131 encrypted with the pubic key 133 of the patient is extracted from the patient personal information embedded image 101*b* of the above described image 110*a*. This extraction is made by the information extracting means 54. As a result of this extraction, the patient personal information embedded image 101*b* is converted into the patient personal information encrypted image 101*a*.

(d) The encryption key 131 is extracted from the first encryption key associated information 141 by using the private key 134 of the patient. This extraction is made by the key decrypting means 56.

(e) The image of the personal information 101 in the medical record is decrypted from the patient personal information encrypted image 101*a* with the encryption key 131. This decryption is made by the image converting means 57.

(g) The patient views his or her own personal information permitted by the hospital A by viewing the image 110*c* obtained in (e).

In this way, the patient can learn his or her own personal information 101 from the pixel value converted image 100 transmitted from the hospital A by using his or her own private key 134. Since the patient does not possess the private key 136 of the hospital B, he or she cannot decrypt and view the secret information, which is not permitted to be viewed by the patient, from the pixel value converted image 100*c*.

<Process for Transmitting the Medical Record to the Hospital by the Patient>

A process for transmitting the medical record from the patient to the hospital B where the second opinion doctor exists after viewing the medical record (pixel value converted image 100*c*) which is received from the hospital A and in which part of the information is encrypted as described above is described next with reference to FIG. 7. In this case, the patient needs to transmit the medical record after again encrypting the personal information 101 in the image 110*c* (hereinafter referred to as a patient viewed image 110*c*), which is illustrated at (f) in FIG. 6 and in which the personal information 101 is not encrypted.

The patient executes the following processes (a) to (g) by using the image encrypting device according to the present invention.

(a) The patient makes the patient viewed image 110*c* visible, for example, on the display of the personal computer with the input means 41.

(b) The patient obtains the public key 135 of the hospital B from the public key management server 190 with the public key obtaining means 44.

(c) The patient specifies the personal information 101 in the patient viewed image 110*c*, which is made visible on the display screen, with the encryption region specifying means 42. Then, the patient encrypts the personal information 101 by using the encryption key 131 with the image converting means 43. As a result, the patient viewed image 110*c* is converted into the image 110*b* including the encrypted hospital information of the hospital A (hospital information image 102) and the encrypted personal information of the patient (patient personal information image 101).

(d) The patient encrypts the encryption key 131 by using the public key 135 of the hospital B with the key encrypting means 45, and generates third encryption key associated information 143 that is the information about the cryptogram generated by the encryption.

(e) The patient buries the third encryption key associated information 143 in the personal information image 101a of the patient in the image 110b with the information embedding means 46 to generate the information embedded image 110a.

(f) The patient executes the pixel value conversion process for the information embedded image 110a with the pixel value converting means 47 to generate a pixel value converted image 100c'.

(g) The patient prints and outputs the pixel value converted image 100c', and transmits the printing medium, on which the pixel value converted image 100c' is printed, to the hospital B. Alternatively, the patient transmits the pixel value converted image 100c' to the hospital B by electronic mail.

In this way, the patient converts the medical record image 110c, in which the personal information 101 is decrypted, into the pixel value converted image 100c' received from the hospital A, and transmits the pixel value converted image 100c' to the hospital B.

<Process for Decrypting the Medical Record by the Hospital B>

Figure 8:
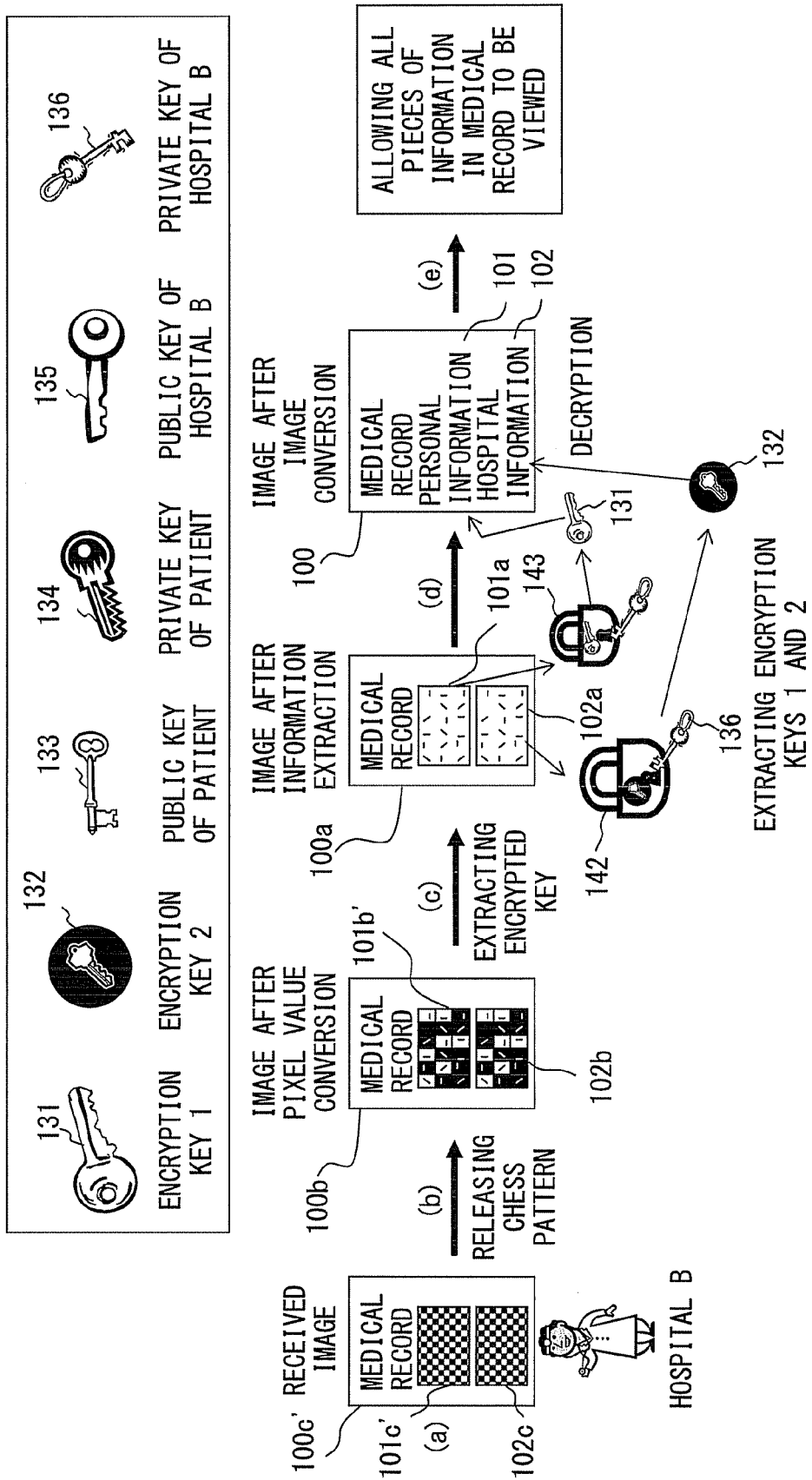
FIG. 8 illustrates a configuration and a method (No. 4) of the second embodiment of the application system to which the present invention is applied.

A process executed by the hospital B that receives and decrypts the medical record (pixel value converted image 100c') transmitted from the patient as a printing medium or a file attached to electronic mail is described with reference to FIG. 8.

The hospital B executes the following processes (a) to (e) by using the image decrypting device according to the present invention.

(a) The second opinion doctor in the hospital B puts the medical record (pixel value converted image 100c') into an image from the printing medium or the file attached to electronic mail, which is received from the patient of the hospital A (hereinafter referred to simply as the patient), with the input means 51.

(b) The doctor specifies a patient personal information pixel value converted image 101c' and a hospital information pixel value converted image 102c in the pixel value converted image 100c' with the encryption region specifying means 42. Then, the doctor executes the pixel value conversion process for the images 101c' and 102c with the pixel value converting means 53 to release the chess pattern of the images 101c' and 102c. As a result, the patient personal information pixel value converted image 101c' and the hospital information pixel value converted image 102c are converted into a patient personal information embedded image 101b' and a hospital information embedded image 102b, respectively.

(c) The doctor extracts the encryption key associated information 143 (information about the encryption key 131 encrypted with the public key 135 of the hospital B) from the patient personal information embedded image 101b' with the information extracting means 54. Then, the doctor extracts the encryption key associated information 142 with the private key 136 of the hospital B. Next, the doctor decrypts the encryption key associated information 143 and 142 with the private key 136 of the hospital B to extract the encryption keys 131 and 132. Then, the doctor decrypts the patient personal information image 101 and the hospital information image 102 by decrypting the image converted image 101a by using the encryption key 131 with the image converting means 56, and by further decrypting the image converted image 102a by using the encryption key 132 with the image converting means 56.

(e) The doctor views the entire medical record including the patient personal information image 101 and the hospital information image 102.

As described above, according to the second embodiment, the hospital A can create the medical record where the personal information of the patient of the hospital A and the hospital information of the hospital A, which is desired not to be viewed by the patient, are image-encrypted by using a plurality of encryption keys and a plurality of public keys (the public keys of the patient and the hospital B). The patient of the hospital A can receive the medical record from the hospital A as a printing medium or a file attached to electronic mail, and can decrypt and view the personal information of the patient himself, which is encrypted in the medical record, by using the private key of the patient. Moreover, the patient encrypts his or her personal information by using the public key of the hospital B after viewing the medial record, and transmits the medical record, in which the personal information of the patient and the hospital information of the hospital A are encrypted, to the hospital B as a printing medium or a file attached to electronic mail similar to the medical record created by the hospital A. Upon receipt of the medical record transmitted from the patient of the hospital A, the second opinion doctor in the hospital B decrypts the encrypted personal information of the patient and the hospital information of the hospital A in the medical record with the private key of the hospital B, and can view these pieces of information.

As described above, according to the second embodiment, three parties such as the hospital A, the patient of the hospital A, and the second opinion doctor of the patient in the hospital B can exchange the medical record with the plurality of encryption keys and the plurality of public keys while retaining the security of the personal information of the patient and the hospital information of the hospital A.

Third Embodiment of the Application System

A third embodiment of the application system according to the present invention is a model in which a resident card is issued from a local government unit such as a city government, etc. to a citizen, who submits the resident card to a school, a dealer, etc., and to which the present invention is applied. The third embodiment is characterized in that a city government A uses the private key (private key of the city government A) of the transmission source in addition to the public key of the transmission destination (public key of a person C) when creating encryption key associated information in the image encryption of the resident card. In the above described first and second embodiments, the encryption key associated information is created by using only the public key of the transmission destination.

The third embodiment is described with reference to FIG. 9.

Figure 9:
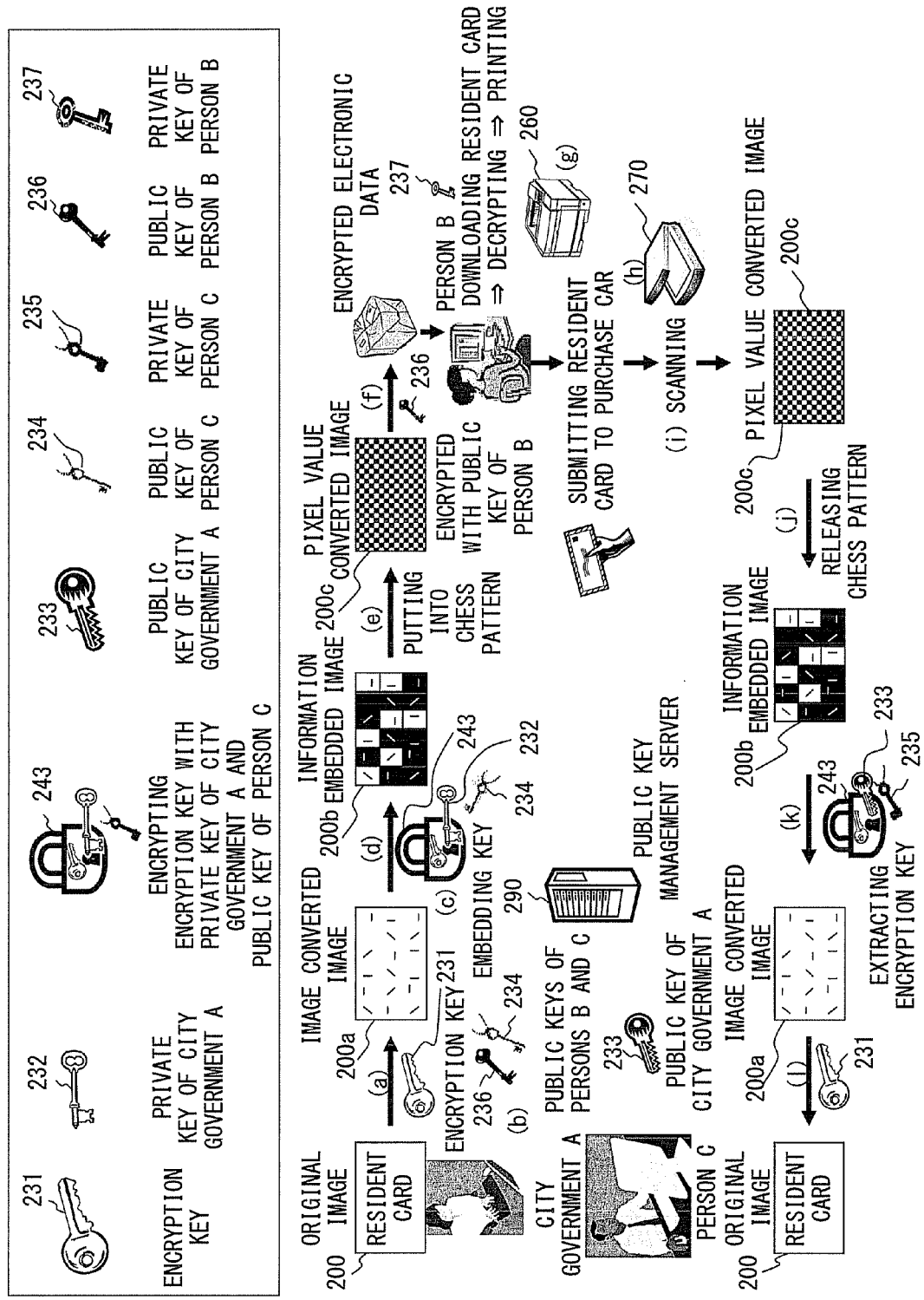
FIG. 9 illustrates a configuration and a method of a third embodiment of the application system to which the present invention is applied.

FIG. 9 illustrates a system configuration and a method in the case in which a person B downloads his or her resident card from the city government A via a network and submits the resident card to the person C, and to which the present invention is applied. The person C is, for example, a car dealer. FIG. 9 illustrates not the whole but only an encrypted portion of the image of the encrypted resident card.

The city government A executes the following processes (a) to (f) by using the image encrypting device according to the present invention.

(a) When the person B requests the city government A to issue the resident card, the city government A captures an image 200 of the resident card (hereinafter referred to as a resident card original image 200) with the input means 41. Then, the person B specifies an important entry (such as an entry of the privacy of a person) in the resident card original image 200 with the encryption region specifying means 42, and encrypts this portion with an encryption key 231. This encryption is made with the image converting means 43. As a result of this encryption, the resident card original image 200 is converted into an image converted image 200a.

(b) The city government A obtains a public key 236 of the person B and a public key 234 of the person C from a public key management server 290 with the public key obtaining means 44.

(c) The city government A encrypts the encryption key 231 by using the public key 234 of the person C and a private key 232 of the city government A with the key encrypting means 45. The encryption key 231 that is encrypted with the public key 234 of the person C and the private key 232 of the city government A is referred to as encryption key associated information 243 for the sake of convenience.

(d) The city government A embeds the encryption key associated information 243 in the image converted image 200a with the information embedding means 46 to generate an information embedded image 200b in which the encryption key associated information 243 is embedded as an image.

(e) The city government A executes the pixel value conversion process for the information embedded image 200b with the pixel value converting means 47 to put the information embedded image 200b into a chess pattern. As a result of putting into the chess pattern, a pixel value converted image 200c is generated.

(f) The city government A electronically encrypts the pixel value converted image 200c by using the public key 236 of the person B. This encryption is made by a known digital encryption technique. Here, the pixel value converted image 200c encrypted with the public key 236 of the person B is referred to as encrypted resident card electronic data for the sake of convenience.

The person B executes the following processes (g) and (h), prints the resident card that is image-encrypted and received from the city government A, and submits the printed matter to the person C.

(g) The person B accesses a public server (not illustrated) of the city government A by using a personal computer, and downloads the electronically encrypted resident card (the encrypted resident card electronic data) of the person B from the public server. Then, the person B decrypts the encrypted resident card electronic data with a private key 237 of the person B, and prints the pixel value converted image 200c, which is obtained with the decryption, on paper with a printer 260. The decryption of the encrypted resident card electronic data is made with a known digital decryption technique.

The resident card (pixel value converted image 200c) where only important entry is put into a chess pattern can be printed, which guarantees that the person who prints the resident card is the person B.

(h) The person B submits the resident card (printed matter), in which the important entry is encrypted, to the person C.

The person C executes the following processes (i) to (l) by using the image decrypting device according to the present invention.

(i) The person C captures the printed matter received from the person B as image data with the input means 41 (a scanner 270 in this example). As a result, the person C can obtain the pixel value converted image 200c.

(j) The person C releases the check pattern of the pixel value converted image 200c with the pixel value converting means 53 to restore the information embedded image 200b from the pixel value converted image 200c.

(k) The person C extracts the encryption key associated information 243 from the information embedded image 200b with the information extracting means 54 to restore the image converted image 200a from the information embedded image 200b. Next, the person C extracts the encryption key 231 from the encryption key associated information 243 by using the private key 235 of the person C and a public key 233 of the city government A with the key decrypting means 56. The person C obtains the public key 233 of the city government A from the public key management server 290.

(l) The person C releases the image encryption of the image converted image 200a by using the encryption key 231 with the image converting means 57 to restore the resident card original image 200. As a result, the person C can read the resident card of the person B by viewing the resident card original image 200.

In the third embodiment, the encryption key 231 can be decrypted from the encryption key associated information 243 by using the private key 235 of the person C and the public key 233 of the city government A, which proves that the printed matter (resident card) that the person C receives from the person B is legally issued from the city government A. Additionally, since not only the public key 233 of the city government A but also the private key 235 of the person C is required to extract the encryption key 231 from the encryption key associated information 243, persons other than the person C cannot view the resident card.

The third embodiment enables the person B (citizen or ward resident) to download the resident card, which can be currently received only at a city or ward government, without going to the city or ward government by using a terminal such as a home personal computer, to print the resident card, and to submit the printed resident card as a printed matter to the person C (a person or a corporation to which the person B needs to submit the resident card).

This can be implemented by satisfying the following conditions (1) to (4).

(1) The city government A can limit the submission destination of the resident card only to the person C by using the public key of the person C.

(2) The city government A can identify the person B as a person who downloads the resident card (resident card where the important entry is encrypted) by using the public key of the person B.

(3) Since the important entry is encrypted in the resident card downloaded from the city government A, the person B can prevent the personal information written in the resident card from leaking.

(4) The image-encrypted resident card submitted from the person B to the person C can be decrypted with the public key of the city government A, which guarantees that the resident card received by the person C from the person B is surely the resident card issued by the city government A.

Embodiment of the Image Encrypting Device According to the Present Invention

The image encrypting device according to the present invention can be implemented with a computer by executing a program (software) in the computer such as a personal computer, etc.

<Hardware Configuration>

Figure 10A:
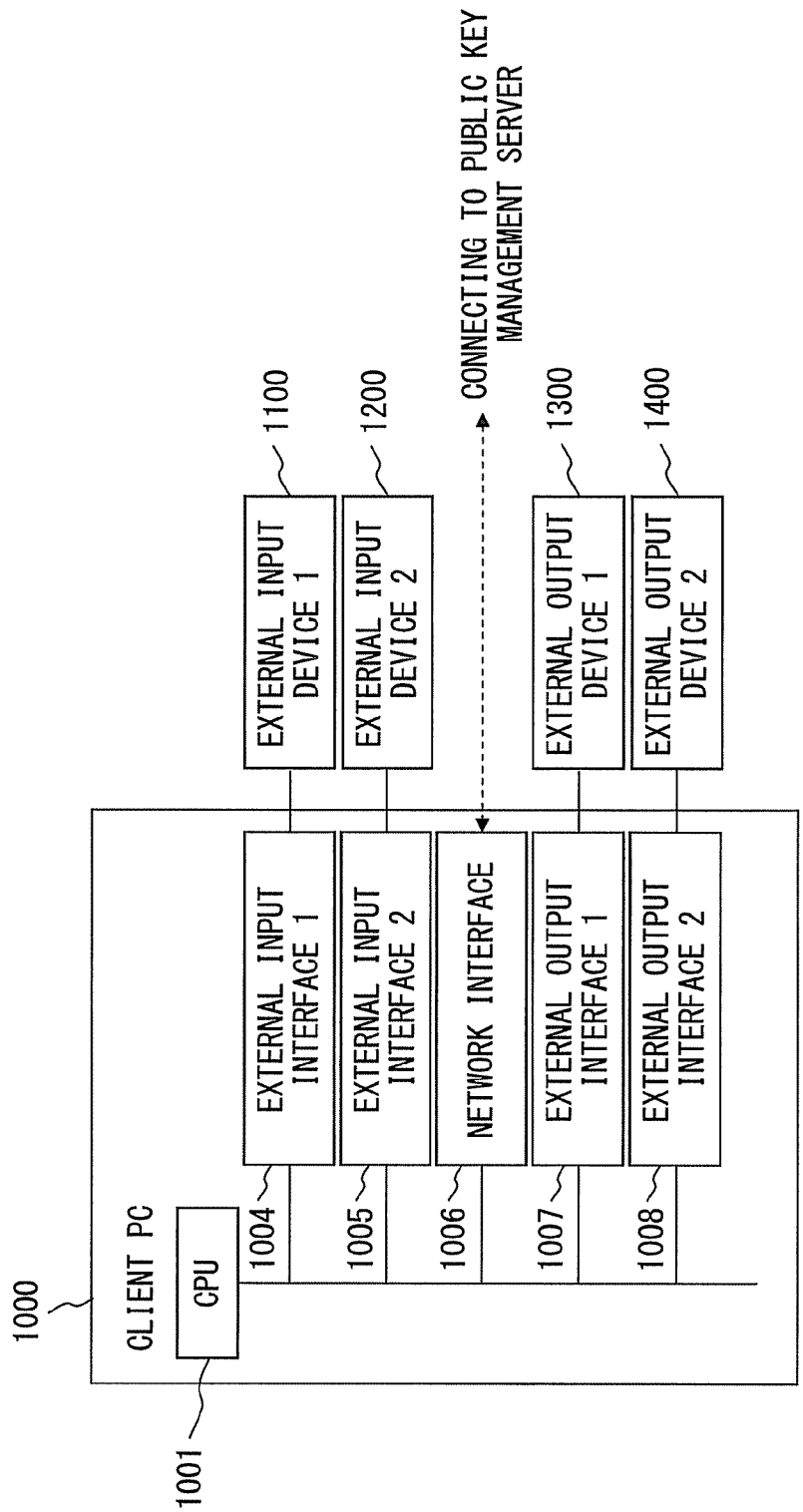
FIGS. 10A and 10B illustrate a hardware configuration and a software configuration of a personal computer that operates as the image encrypting device according to the present invention.
Figure 10B:
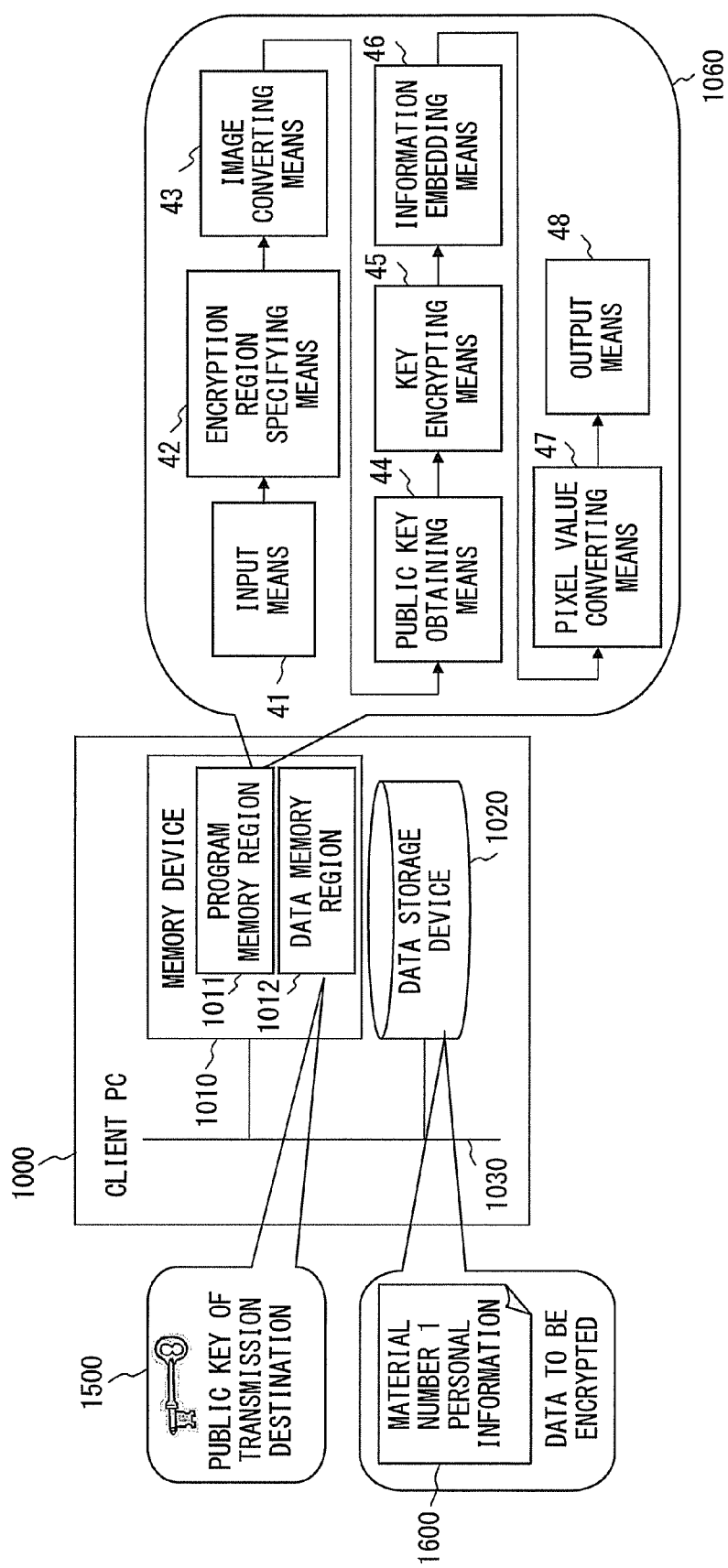

FIGS. 10A and 10B illustrate a hardware configuration of a personal computer that operates as the encrypting device according to the present invention.

The personal computer (PC) 1000 that is the encrypting device according to the embodiment includes a CPU 1001, a first external input interface unit 1004 (external input interface 1), a second external input interface unit 1005 (external input interface 2), a network interface unit 1006, a first external output interface unit 1007 (external output interface 1), a second external output interface unit 1008 (external output interface 2), a memory device 1010 and a data storage device 1020. The CPU (Central Processing Unit) 1001 is connected to the other components of the personal computer 1000 via a bus 1030.

The first external input interface unit 1004 is an interface with a first external input device 1100 (external input device 1) having an image reading function such as a scanner, etc. To the first external input interface unit 1004, a digital image of a document, etc. read by the first external input device 1100 is input from the first external input device 1100. The second external input interface unit 1005 is an interface with a keyboard, a mouse, etc. To the second external input interface unit 1005, input data, an operation signal, etc. are input from the second external input device 1200 (external input device 2) such as the keyboard, the mouse, etc.

The network interface unit 1006 is, for example, a LAN (Local Area Network) interface, etc. The network interface unit 1006 communicates and connects with the public key management server and the Internet via a LAN, a router, etc., and receives a target public key from the public key management server 90.

The first external output interface unit 1007 is an interface with a first external output device 1300 (external output device 1) having a printing function such as a printer, etc. The first external output interface unit 1007 outputs a print control command and print data to the first external output device 1300. The second external output interface unit 1008 is an interface with a second external output device 1400 (external output device 2) having an image display function such as a display, etc. The second external output interface unit 1008 outputs an image display control command and image data to the second external output device 1400.

The memory device 1010 is a main memory of the CPU 1001, and has a program memory region 1011 and a data memory region 1012. The program memory region 1011 is a region for storing a program 1060 that causes the personal computer 1000 to operate as the image encrypting device. This program 1060 is loaded into the program memory region 1011 in a format executable by the CPU 1001.

By being executed by the CPU 1001, the program 1060 causes the personal computer 1000 to operate as the image encrypting device 40 including the input means 41, the encryption region specifying means 42, the image converting means 43, the public key obtaining means 44, the key encrypting means 45, the information embedding means 46, the pixel value converting means 47 and the output means 48, which are illustrated in FIG. 2.

The data memory region 1012 stores an encryption key and a public key 1500 of a transmission destination of image-encrypted data, and the like. In the memory device 1010, also fundamental software (OS: Operating System), middleware such as TCP/IP protocol stack, etc. are stored. The data memory region 1012 stores data input from the first and the second external input devices 1100 and 1200, data output to the first and the second external output devices 1300 and 1400, and working data required when the CPU 1001 executes the above described program.

The data storage device 1020 is, for example, an internal HDD (Hard Disk Drive) or a storage device in which a portable recording medium such as a CD, a DVD, etc. is inserted. The data storage device 1020 stores data 1600 to be encrypted (image-encrypted), and the like. The data storage device 1020 may be a small portable recording medium such as a USB (Universal Serial Bus) memory connected to a USB terminal, an SD (Secure Digital) memory card, a memory stick, etc., which is inserted into a card slot, or the like.

The CPU 1001 controls the entire personal computer, and also controls the other components.

<Process Procedures by the Image Encrypting Device>

Figure 11A:
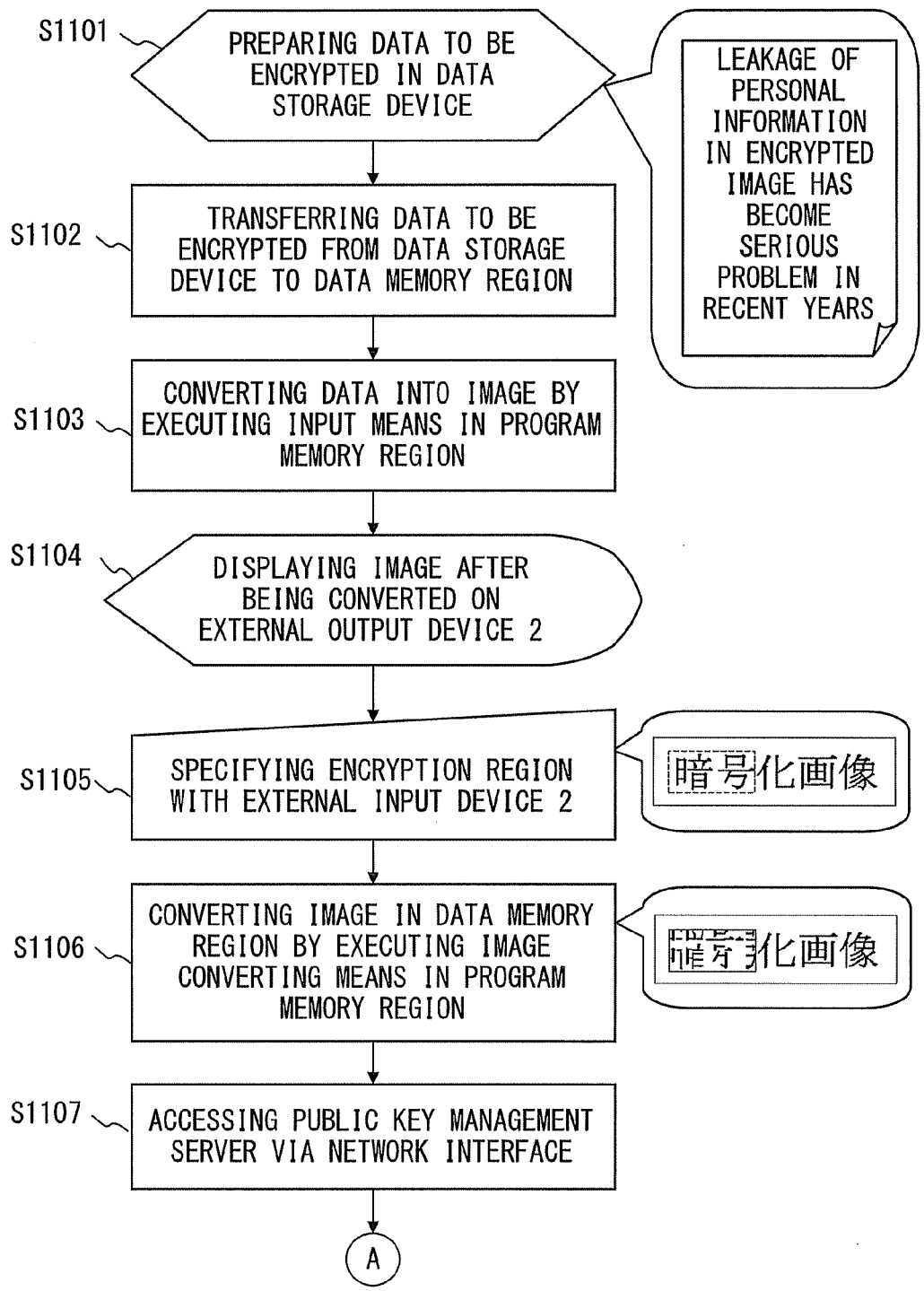
FIGS. 11A and 11B are a flowchart illustrating an image encryption process implemented in a way such that a CPU of the personal computer illustrated in FIGS. 10A and 10B executes a program stored in a program memory region.
Figure 11B:
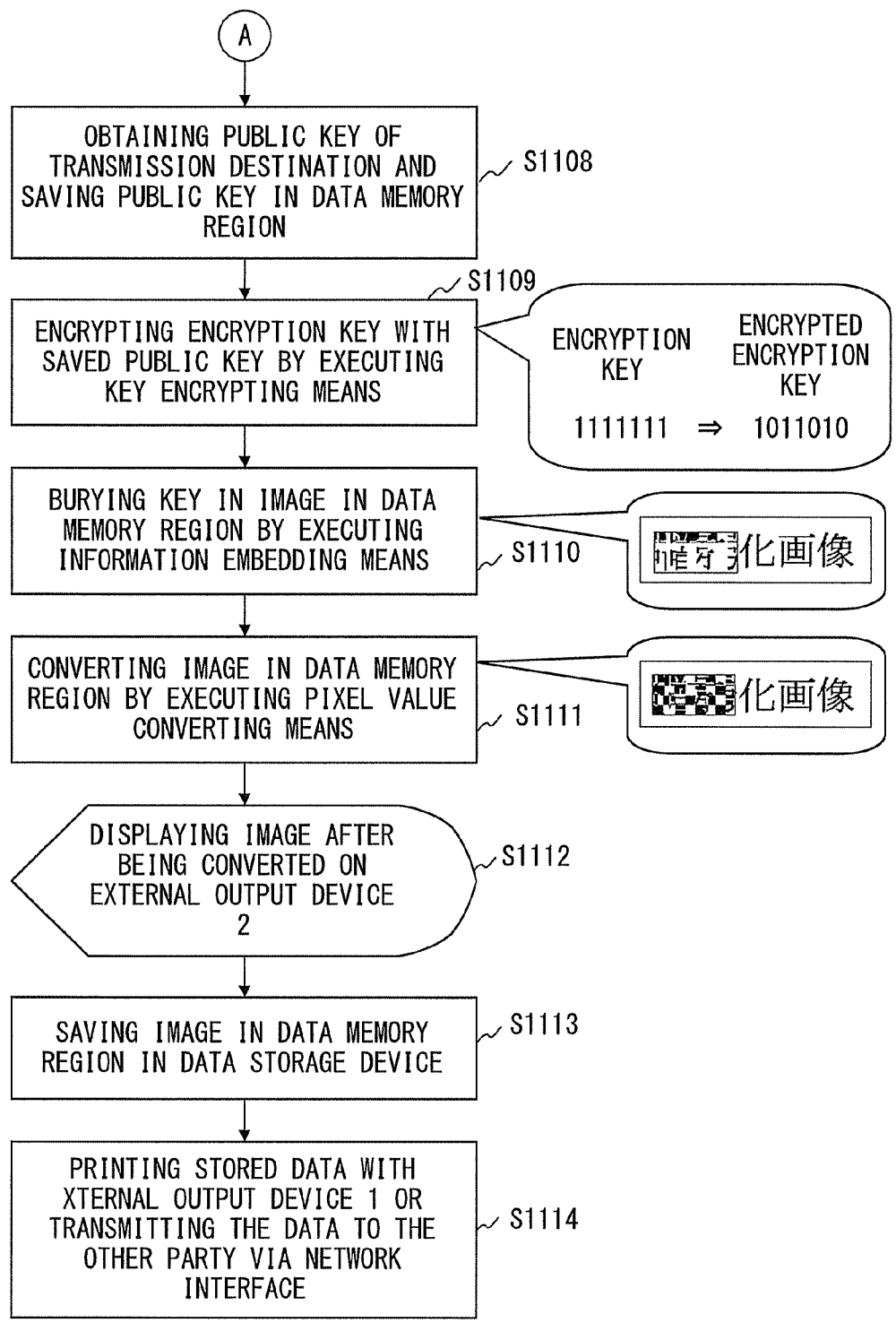
Figure 12:
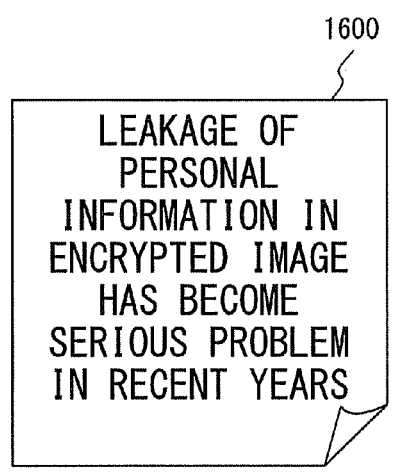
FIG. 12 illustrates one example of data to be encrypted (encryption data)

FIGS. 11A and 11B are a flowchart illustrating the image encryption process implemented in a way such that the CPU 1001 of the personal computer 1000 illustrated in FIGS. 10A and 10B executes the program 1060 stored in the program memory region 1011. Procedures of the image encryption process are described with reference to FIGS. 11A and 11B.

The data 1600 to be encrypted (hereinafter referred to as the data to be encrypted 1600) is prepared in the data storage device 1020 (S1101).

The data to be encrypted 1600 is transferred from the data storage device 1020 to the data memory region 1012 (S1102). The data to be encrypted 1600 is converted into an image (image data in a bitmap format, etc.) by executing the input means 41 in the program memory region 1011 (S1103). The image (image data) of the data to be encrypted 1600 is stored in the data memory region 1012.

The image of the data to be encrypted 1600 is displayed on the second external output device 1400 (S1104). The encryption region of the image in the data to be encrypted 1600, which is displayed as an image on the screen of the second external output device 1400, is specified with the second external input device 1200 (such as a mouse, etc.) by executing the encryption region specifying means 42 in the program memory region 1011 (S1105).

Figure 13:
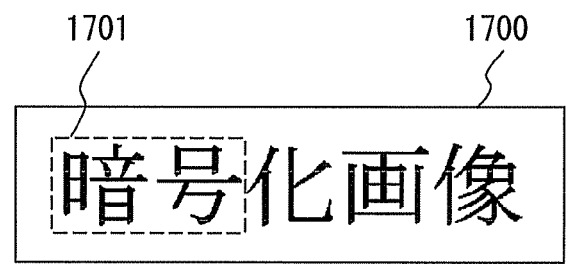
FIG. 13 illustrates a method for specifying an encryption region of the encryption data illustrated in FIG. 12.

FIG. 13 illustrates one example of the method for specifying the encryption region of the image in the data to be encrypted 1600. In this example, the data to be encrypted 1600 is illustrated as words "暗号化画像" ("encrypted image"), and the region including the image of the word "暗号" (region enclosed with a dotted rectangle) is specified as an encryption region 1701.

Figure 14:
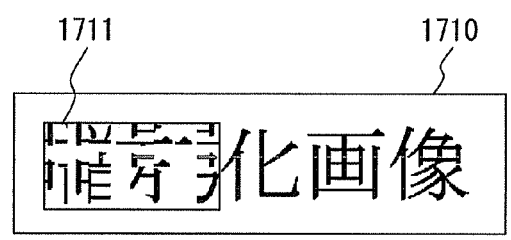
FIG. 14 illustrates a state after an image in the encryption region illustrated in FIG. 13 is converted.

The image (image data) of the encryption region 1701 in an image 1700 of the data to be encrypted 1600 in the data memory region 1012 is converted into an image converted image with an encryption key (not illustrated) by executing the image converting means 43 in the program memory region 1011 (S1106). As a result of this image conversion process, the image of the encryption region 1701 is converted from a readable state (original image) illustrated in FIG. 13 into an unreadable state (image converted image 1711) illustrated in FIG. 14. As a result, the entire image of the data to be encrypted 1600 is converted into an image 1710 including the pixel value converted image 1711 as illustrated in FIG. 14.

The public key management server is accessed via the network interface unit 1006 by executing the public key obtaining means 44 in the program memory region 1011 (S1107). Then, a public key 1500 of a data transmission destination is obtained from the public key management server, and stored and saved in the data memory region 1012 (S1108).

The encryption key is encrypted with the public key 1500 by executing the key encrypting means 45 in the program memory region 1011 (S1109). In this encryption process, for example, a binary bit string (binary data) of "1111111" is encrypted into a binary bit string of "1011010" by using the public key 1500. Here, the encrypted encryption key is referred to as encryption key associated information in a similar manner as in the above described embodiments.

Figure 15:
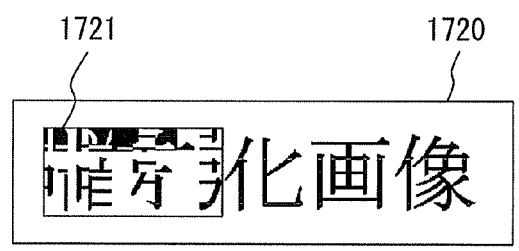
FIG. 15 illustrates the state of the image in the encryption region after a process for embedding encryption key associated information in the image of the encryption region illustrated in FIG. 14 is executed.

The encryption key associated information is embedded in the image (the image converted image 1711 obtained with the process of step S1106) of the encryption region 1701 in the data memory region 1012 by executing the information embedding means 46 in the program memory region 1011 (S1110). As a result, the image of the encryption region 1701 is converted from the state (image converted image 1711) illustrated in FIG. 14 into a state (information embedded image 1721) illustrated in FIG. 15. In this way, the entire image of the data to be encrypted 1600 is converted into an image 1720 including the information embedded image 1721 as illustrated in FIG. 15.

Figure 16:
FIG. 16 illustrates the state of the image in the encryption region after a pixel value conversion process is executed for the image of the encryption region illustrated in FIG. 14.

The information embedded image 1721 in the data memory region 1012 is converted by executing the pixel value converting means 47 in the program memory region 1011 (S1111). As a result, the image of the encryption region 1701 is converted from the state (information embedded image 1721) illustrated in FIG. 15 into a state (pixel value converted image 1731 of a chess pattern) illustrated in FIG. 16. In this way, the entire image of the data to be encrypted 1600 is converted into an encrypted image 1730 including the pixel value converted image 1731 as illustrated in FIG. 16.

The encrypted image 1730 generated with the process of step S1111 is displayed on the second external output device 1400 (S1112). Then, the encrypted image 1730 in the data memory region 1012 is transferred and saved in the data storage device 1020 (S1113).

The encrypted image 1730 stored in the data memory region 1012 or the data storage device 1020 is printed on a paper medium, etc. with the first external output device 1300, or transmitted to a transmission destination by electronic mail via the network interface unit 1006 by executing the output means 48 in the program memory region 1011 (S1114).

Embodiment of the Image Decrypting Device According to the Present Invention

The image decrypting device according to the present invention can be implemented with a computer by executing a program (software) in the computer such as a personal computer, etc. similar to the above described image encrypting device.

<Hardware Configuration>

Figure 17A:
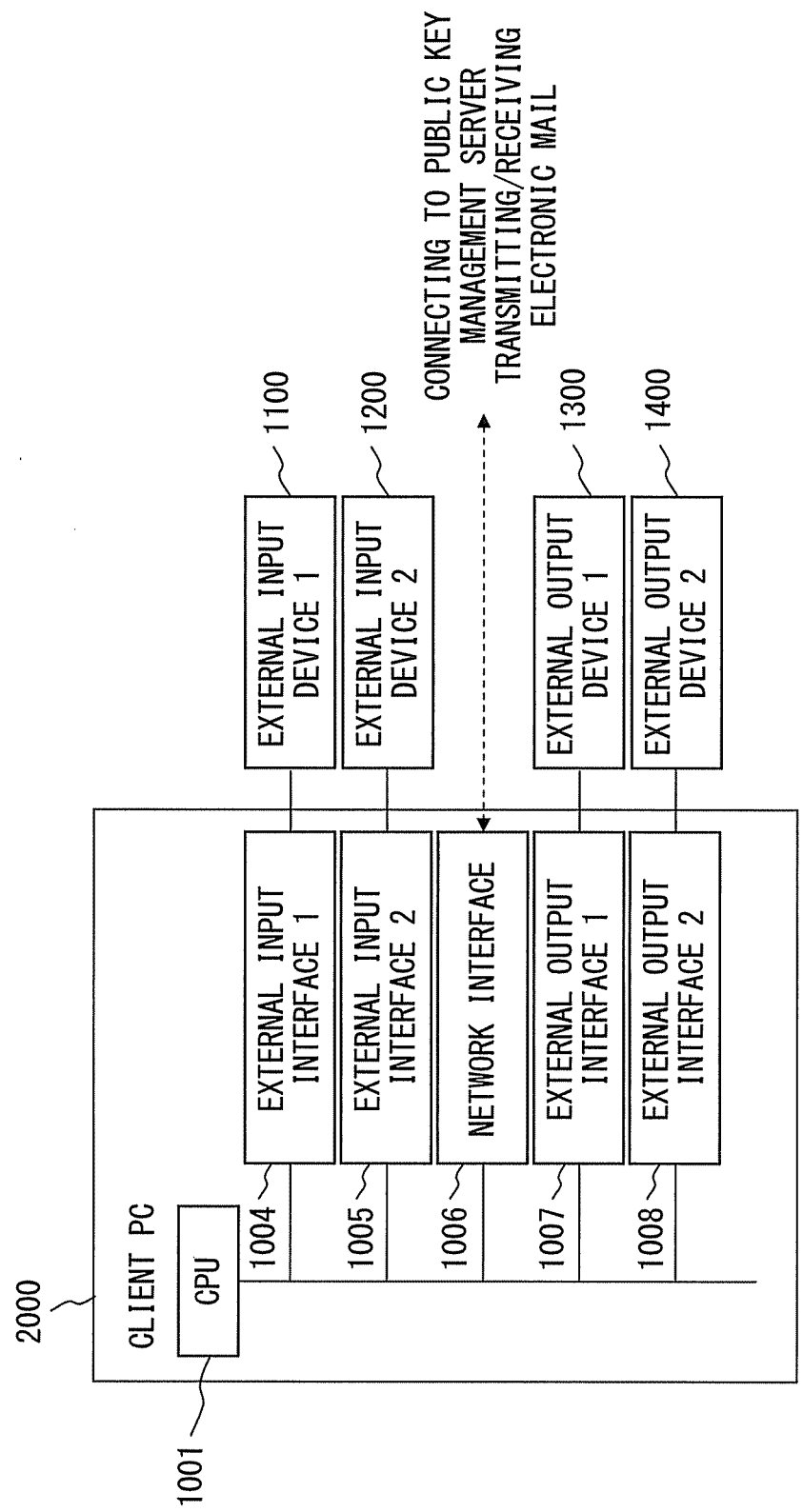
FIGS. 17A and 17B illustrate a hardware configuration and a software configuration of a personal computer that operates as the image decrypting device according to the present invention.
Figure 17B:
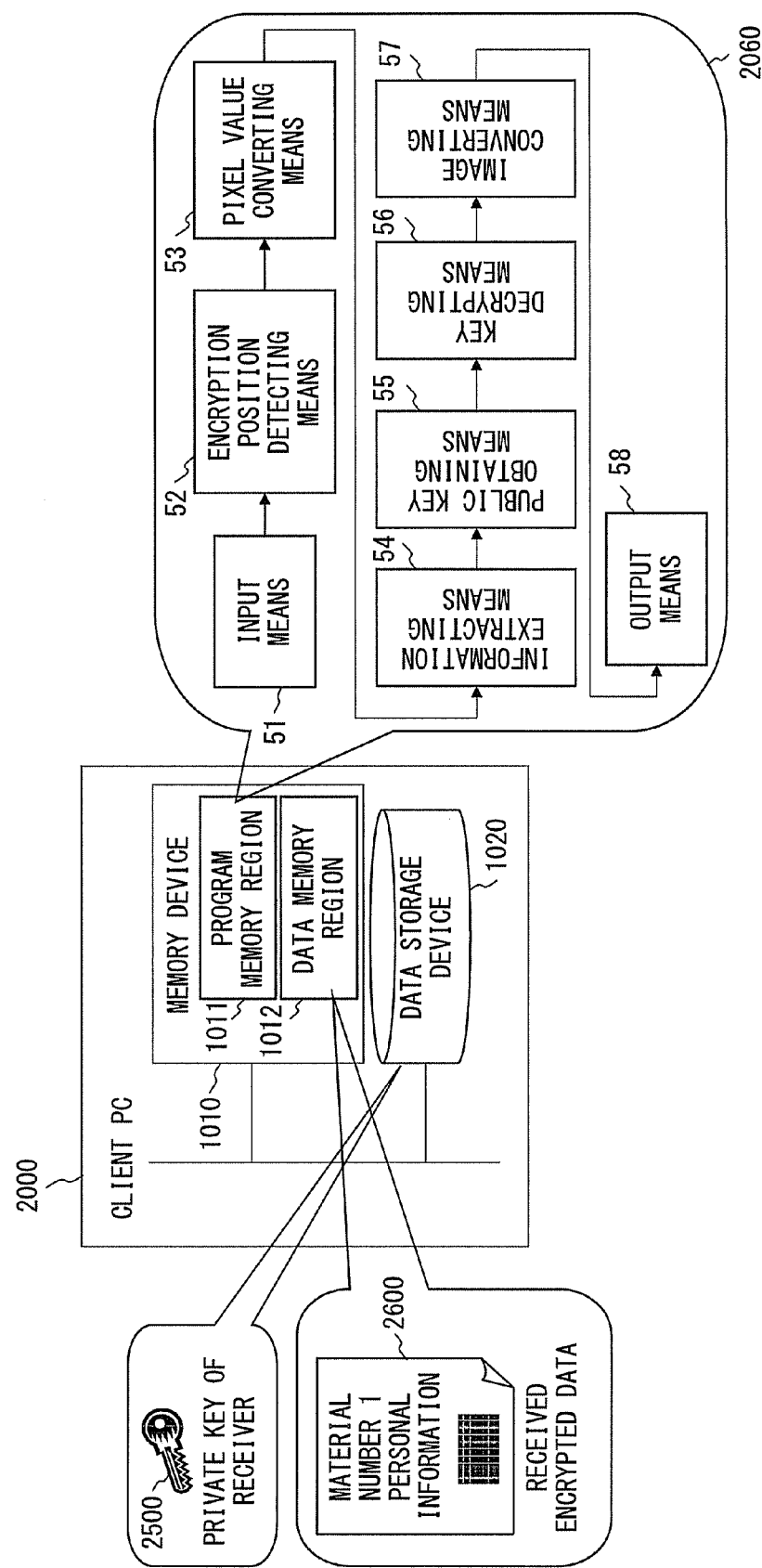

FIGS. 17A and 17B illustrates a hardware configuration of a personal computer that operates as the image decrypting device according to the present invention. In FIGS. 17A and 17B, the same components as those in FIGS. 10A and 10B are denoted with the same reference numerals.

The personal computer (PC) 2000 that is the image decrypting device according to this embodiment has almost the same hardware configuration as the personal computer 1000 illustrated in FIGS. 10A and 10B. Accordingly, explanations about the same components as those included in the above described personal computer 1000 are omitted.

A difference between the personal computer 2000 that operates as the image decrypting device and the personal computer 1000 that operates as the image encrypting device exists in the contents of the program that is stored in the program memory region 1011 in the memory device 1010 and executed by the CPU 1001.

The personal computer 2000 according to this embodiment is the image decrypting device for decrypting image-encrypted data generated by the personal computer 1000 that operates as the image decrypting device illustrated in FIGS. 10A and 10B.

In the personal computer 1000, the program 1060 for the image encryption process configured as illustrated in FIG. 2 is stored in the program memory region 1011. In contrast, a program 2060 for the image decryption process configured as illustrated in FIG. 3 is stored in the program memory region 2011 in the personal computer 2000. By being executed by the CPU 1001, this program 2060 causes the personal computer 2000 to operate as the image decrypting device including the input means 51, the encryption position detecting means 52, the pixel value converting means 53, the information extracting means 54, the public key obtaining means 55, the key decrypting means 56, the image converting means 57 and the output means 58. However, the function of the public key obtaining means 55 is not always essential, and required only when the encryption key associated information is generated with a public key at the side of generating an encrypted image and a private key at the side of decrypting the encrypted image. In this case, the public key obtaining means 55 obtains a public key pairing with the private key.

Additionally, the data memory region 1012 of the memory device 1010 saves encrypted data (encrypted image) 2600 (encrypted image generated by the image encrypting device (personal computer 1000) illustrated in FIGS. 10A and 10B), which is input via the first external input device 1100 or the network interface 1006. The data storage device 1020 also saves a private key 2500 pairing with the public key 1500 used to encrypt the encryption key when image-encrypted data 2600 is generated.

<Procedures for the Image Decryption Process>

Figure 18A:
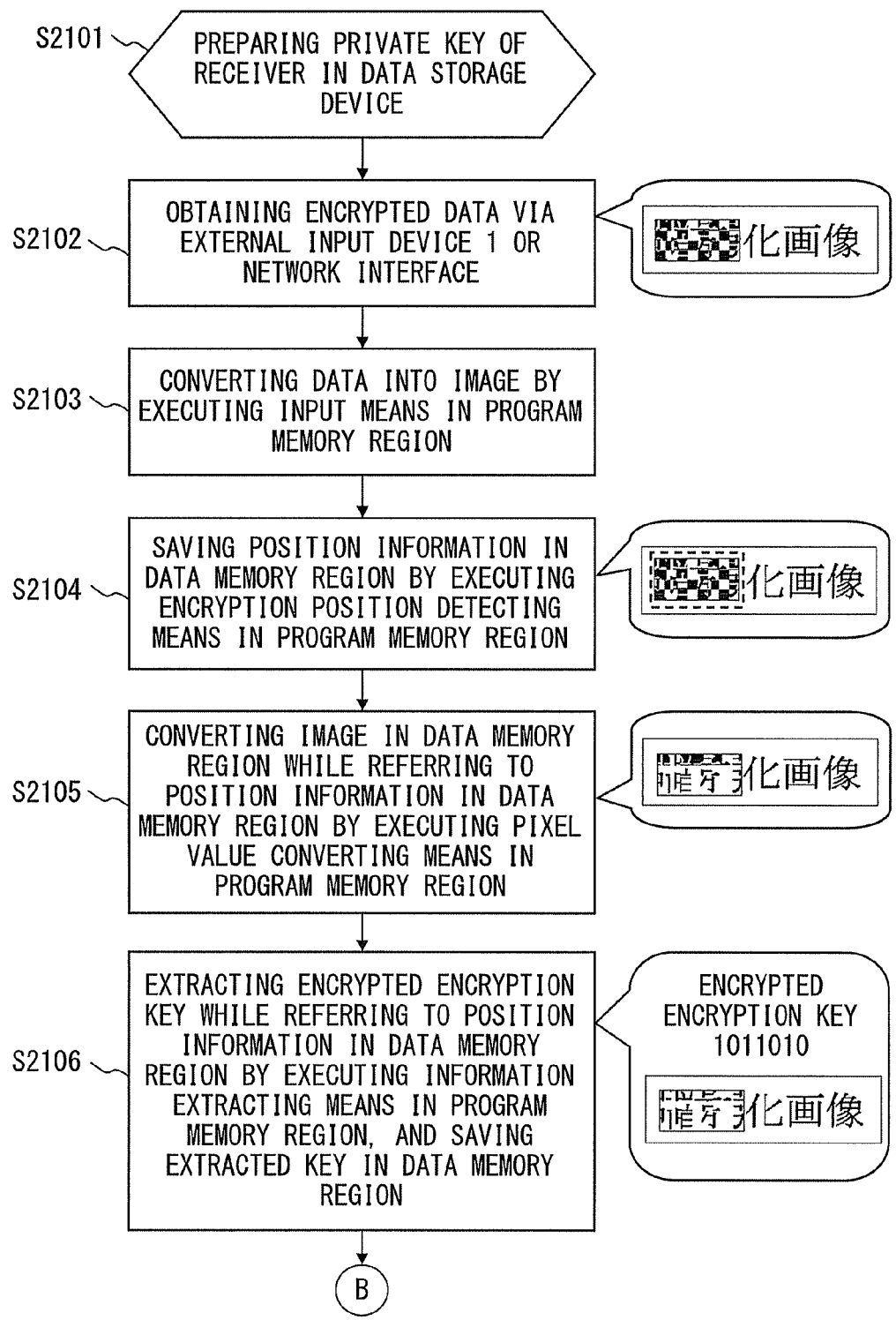
FIGS. 18A and 18B are a flowchart illustrating process procedures of the personal computer that is illustrated in FIGS. 17A and 17B and operates as the image decrypting device.
Figure 18B:
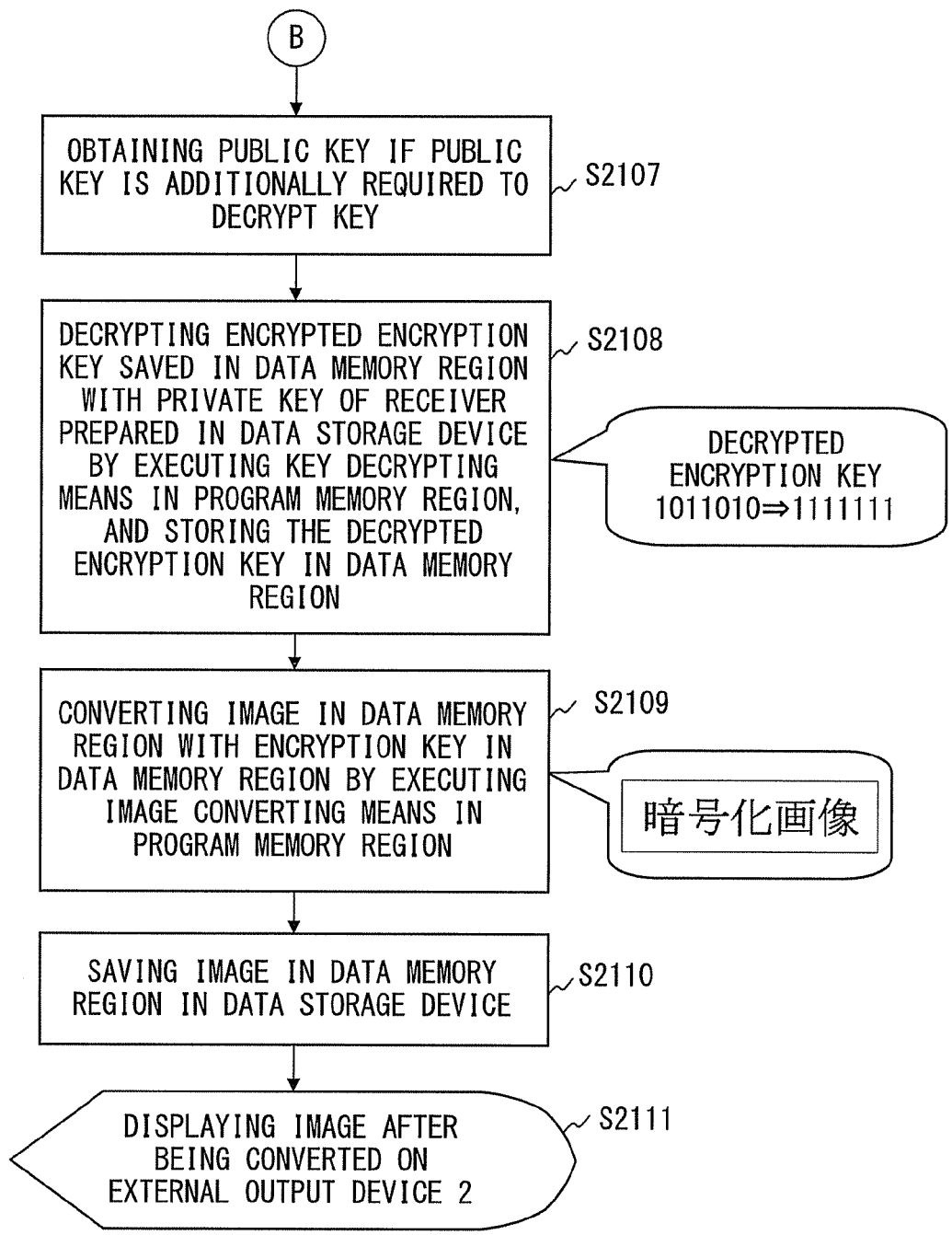

FIGS. 18A and 18B are a flowchart illustrating the process procedures of the personal computer 2000 that operates as the image decrypting device illustrated in FIGS. 17A and 17B. The process represented by this flowchart is executed in a way such that the CPU 1001 of the personal computer 2000 executes the program 2060 in the program memory region 1011. The following explanation about the flowchart refers to an example of decrypting the encrypted data 1700 illustrated in FIG. 16.

Initially, the private key of a receiver (receiver of encrypted data generated by the personal computer 1000 (image encrypting device) illustrated in FIGS. 10A and 10B) is prepared in the data storage device 1020 (S2101).

As a result of this process, the private key 2500 is saved in the data storage device 1020.

The encrypted data generated by the personal computer 1000 (image encrypting device) illustrated in FIGS. 10A and 10B is obtained from the first external input device 1100 or the network interface 1006, and saved in the data memory region 1012 (S2102).

As a result of this process, the encrypted image 1730 illustrated in FIG. 16 is obtained in the form of a printed matter or electronic data (referred to as encrypted data here), and saved in the data memory region 1012.

The encrypted data in the data memory region 1012 is converted into an image in a bitmap format, etc. (image data) by executing the input means 51 in the program memory region 1011 (S2103). The image obtained with this conversion is referred to as an encrypted image. This encrypted image is an encrypted image (an image equal to the encrypted image 1730 illustrated in FIG. 16) that is finally generated by the image encrypting device illustrated in FIGS. 10A and 10B.

The position information of the encryption region in the encrypted image is detected by executing the encrypted position detecting means 52 in the program memory region 1011, and saved in the data memory region 1012 (S2104).

By executing the pixel value converting means 53 in the program memory region 1011, the image (pixel value converted image) of the encryption region in the encrypted image in the data memory region 1012 is converted into an information embedded image while referring to the position information of the encryption region in the data memory region 1012 (S2105).

As a result of this process, the image of the encryption region 1701 in the encrypted image 1730 illustrated in FIG. 16 is converted from the state (pixel value converted image 1731) illustrated in FIG. 16 into the state (information embedded image 1721) illustrated in FIG. 15.

By executing the information extracting means 54 in the program memory region 1011, encryption key associated information (encrypted encryption key) is extracted from the information embedded image while referring to the position information of the encryption region in the data memory region 1012. Then, the extracted information is stored in the data memory region 1012 (S2106).

As a result of this process, "1011010" is extracted as the encryption key associated information from the image (information embedded image 1721) of the encryption region illustrated in FIG. 15. Moreover, the image of the encryption region 1701 is converted from the state (information embedded image 1721) illustrated in FIG. 15 into the state (image converted image 1711) illustrated in FIG. 14 by extracting the encryption key associated information.

If a public key is additionally required to decrypt the encryption key associated information (encrypted encryption key), the public key pairing with the private key 2500 is obtained from the public key management server 190 via the network interface 1006 by executing the public key obtaining means 55 in the program memory region 1011 (S2107).

The encryption key associated information (encrypted encryption key) saved in the data memory region 1012 is decrypted into the encryption key by using the private key 2500 of the receiver, which is prepared in the data storage device 1020, by executing the key decrypting means 56 in the program memory region 1011. Then, the encryption key is saved in the data memory region 1012 (S2108). If the encryption key associated information is the encryption key that is encrypted with the private key 2500 and the public key obtained from the public key management server 90 in the process for decrypting the encryption key in step S2108, the encryption key associated information is decrypted with the private key 2500 and the public key.

As a result of this process, the encryption key ("1111111") is decrypted from the encryption key associated information ("1011010").

The image of the encryption region in the data memory region 1012 is converted into the original image by using the encryption key in the data memory region 1012 by executing the image converting means 57 in the program memory region 1011 (S2109).

As a result of this process, the image of the encryption region 1701 is converted from the state (image converted image 1711) illustrated in FIG. 14 into the state (original image) illustrated in FIG. 13. In this way, the encrypted image 1731 of the encryption region 1701 in the encrypted image 1730 input with the input means 51 of the image encrypting device is finally decrypted into a text image of "暗 号" and the original image 1700 that represents the words "暗 号化画像" ("encrypted image") including the text image is restored.

The original image (data of the original image) in the data memory region 1012 is saved in the data storage device 1020 (S2110).

The original image in the data storage device 1020 is output to (displayed on) the second external output device 1400 (such as a display) via the second external output interface 1008 (S2111).

The present invention is not limited to the above described embodiments, and can be implemented by being modified in a variety of ways within the scope that does not depart from the gist of the present invention. For example, the functions of the present invention may be embedded, for example, a copy machine (including a complex machine), a facsimile, a printer, a scanner, an overhead reader, a cellular phone, a portable terminal, a digital camera, a TV, etc. in addition to a personal computer.

The present invention allows many users such as government offices, companies, general users, etc. to safely exchange important information such as personal information, etc., which is required to be secret, at low cost by using various types of media such as a paper medium, a storage medium, electronic data, etc. Accordingly, the present invention is very useful when government offices, companies and general users exchange important information required to be secret.

What is claimed is:

1. An image encrypting device for encrypting an image, the image encrypting device comprising:
a computer configured to:
input image data to be encrypted;
specify an encryption region to be encrypted in the image data;
convert the encryption region into a first image by using an encryption key;
obtain a public key of a transmission destination of the data to be encrypted;
encrypt the encryption key by using the public key;
embed encryption key associated information, which is information about the encrypted encryption key, in the first image to convert the encryption region into a second image;
convert a pixel value of the second image at certain cycles in a horizontal direction and a vertical direction of the second image to convert the encryption region into a third image; and
output an encrypted image, which is obtained by converting an image of the encryption region into the third image in the image data, in a predetermined method.

2. The image encrypting device according to claim 1, wherein:
the computer specifies a plurality of encryption regions;
converts images of the plurality of encryption regions individually by using a plurality of encryption keys;
obtains a plurality of public keys; and
encrypts the plurality of encryption keys individually by using the plurality of public keys.

3. The image encrypting device according to claim 2, wherein
the plurality of public keys are public keys of a plurality of transmission destinations.

4. The image encrypting device according to claim 1, wherein
the computer obtains the public key from a public key management server that manages the public key.

5. An image decrypting device for decrypting an encrypted image including an image encrypted into an original image, the image decrypting device comprising:

a computer configured to:

input the encrypted image as image data;

detect a position of an encryption region that is a region, in which an image is encrypted in the encrypted image, by analyzing the encrypted image;

restore a pixel value of the image of the encryption region to a pixel value before being converted by a first conversion process for converting a pixel value of the image of the encryption region at certain cycles in a horizontal direction and a vertical direction of the image of the encryption region, by executing a second conversion process reverse to the first conversion process in order to identify the position of the encryption region on the basis of information about the position of the encryption region;

extract encryption key associated information, which is information about an encryption key embedded in the image of the encryption region, from the restored image of the encryption region;

decrypt a decryption key, which is used to decrypt the image of the encryption region, from the encryption key associated information by using a first private key pairing with a first public key used to generate the encryption key associated information;

decrypt an original image by decrypting the image of the encryption region by using the decrypted decryption key; and output the original image in a predetermined method.

6. The image decrypting device according to claim 5, wherein the first private key is a private key that is possessed by a transmission destination of the encrypted image and used by another party, to which the transmission destination submits the encrypted image, to decrypt the encrypted image.

7. The image decrypting device according to claim 5, wherein the computer obtains a public key to obtain a second public key pairing with a second private key when the encryption key associated information is encrypted with the first public key and the second private key, and decrypts the decryption key from the encryption key associated information by using the first private key and the second public key.

8. The image decrypting device according to claim 5, wherein:

each piece of encryption key associated information, which is included in an image of each of a plurality of encryption regions, is information about an individual encryption key;

the computer extracts an individual piece of the encryption key associated information from each of the plurality of encryption regions; and the computer decrypts, from each piece of the encryption key associated information, each decryption key used to decrypt the image of each of the plurality of encryption regions, in which each piece of the encryption key associated information is embedded, by using a private key pairing with a public key used to generate each piece of the encryption key associated information.

9. The image decrypting device according to claim 5, wherein the computer obtains the public key from a public key management server that manages the public key.

10. An image encrypting method for encrypting an image, the image encrypting method comprising:

inputting image data to be encrypted;

specifying an encryption region to be encrypted in the image data;

converting the specified encryption region into a first image by using an encryption key;

obtaining a public key of a transmission destination of the data to be encrypted;

encrypting the encryption key by using the obtained public key;

embedding encryption key associated information, which is information about the encrypted encryption key, in the first image to convert the encryption region into a second image;

converting a pixel value of the second image at certain cycles in a horizontal direction and a vertical direction of the second image to convert the encryption region into a third image; and outputting an encrypted image, which is obtained by converting an image of the encryption region into the third image in the input image to be encrypted, in a predetermined method.

11. The image encrypting method according to claim 10, wherein:

the specifying the region to be encrypted specifies a plurality of encryption regions;

the converting the specified encryption region converts images of the plurality of encryption regions individually by using a plurality of encryption keys;

the obtaining the public key obtains a plurality of public keys; and the encrypting the encryption key encrypts the plurality of encryption keys, which are used to convert the images of the plurality of encryption regions, individually by using the plurality of public keys.

12. The image encrypting method according to claim 10, wherein the plurality of public keys obtained are public keys of a plurality of transmission destinations.

13. An image decrypting method for decrypting an encrypted image including an image encrypted into an original image, the image decrypting method comprising:

inputting the encrypted image as image data;

detecting a position of an encryption region that is a region, in which an image is encrypted in the encrypted image, by analyzing the encrypted image;

restoring a pixel value of the image of the encryption region to a pixel value before being converted by a first conversion process for converting a pixel value of the image of the encryption region at certain cycles in a horizontal direction and a vertical direction of the image of the encryption region, by executing a second conversion process reverse to the first conversion process in order to identify the position of the encryption region on the basis of information about the detected position of the encryption region;

extracting encryption key associated information, which is information about an encryption key embedded in the image of the encryption region, from the restored image of the encryption region;

decrypting a decryption key, which is used to decrypt the image of the encryption region, from the encryption key associated information by using a first private key pairing with a first public key used to generate the extracted encryption key associated information;

decrypting the original image by decrypting the image of the encryption region by using the decrypted decryption key; and outputting the original image in a predetermined method.

14. The image decrypting method according to claim 13, wherein
the first private key is a private key that is possessed by a transmission destination of the encrypted image and used by another party, to which the transmission destination submits the encrypted image, to decrypt the encrypted image.

15. The image decrypting method according to claim 13, further comprising
obtaining a public key to obtain a second public key pairing with a second private key when the encryption key associated information is encrypted by using the first public key and the second private key, wherein
the decrypting the decryption key decrypts the decryption key from the encryption key associated information by using the first private key and the second public key.

16. The image decrypting method according to claim 13, wherein:
each piece of encryption key associated information, which is included in an image of each of a plurality of encryption regions, is information about an individual encryption key;
the extracting the encryption key associated information extracts an individual piece of the encryption key associated information from each of the plurality of encryption regions; and
the decrypting the decryption key decrypts each decryption key used to decrypt the image of each of the plurality of encryption regions, in which each piece of the encryption key associated information is embedded, is decrypted by using a private key pairing with a public key, which is used to generate each piece of the encryption key associated information, from each piece of the encryption key associated information.

17. A storage medium not including a signal, storing an image encrypting program for causing a computer, in order to encrypt an image, to execute a process comprising:
inputting image data to be encrypted;
specifying an encryption region to be encrypted in the image data;
converting the encryption region into a first image by using an encryption key;
obtaining a public key of a transmission destination of the data to be encrypted;
encrypting the encryption key by using the public key;
embedding encryption key associated information, which is information about the encrypted encryption key, in the first image to convert the encryption region into a second image;
converting a pixel value of the second image at certain cycles in a horizontal direction and a vertical direction of the second image to convert the encryption region into a third image; and
outputting an encrypted image, which is obtained by converting an image of the encryption region into the third image in the image data, in a predetermined method.

18. The storage medium according to claim 17, wherein:
the specifying the encryption region specifies a plurality of encryption regions;
the converting the encryption region converts images of the plurality of encryption regions individually by using a plurality of encryption keys;
the obtaining the public key obtains a plurality of public keys; and
the encrypting the encryption key encrypts the plurality of encryption keys individually by using the plurality of public keys.

19. The storage medium according to claim 18, wherein
the converting the encryption region individually converts an image in each of the plurality of encryption regions by using an individual encryption key.

20. The storage medium according to claim 18, wherein
the plurality of public keys are public keys of a plurality of transmission destinations.

21. A storage medium not including a signal, storing an image decrypting program for causing a computer, in order to decrypt an encrypted image including an image encrypted into an original image, to execute a process comprising:
inputting the encrypted image as image data;
detecting a position of an encryption region that is a region, in which an image is encrypted in the encrypted image, by analyzing the encrypted image;
restoring a pixel value of an image of the encryption region to a pixel value before being converted by a first conversion process for converting a pixel value of the image of the encryption region at certain cycles in a horizontal direction and a vertical direction of the image of the encryption region, by executing a second conversion process reverse to the first conversion process in order to identify the position of the encryption region on the basis of information about the position of the encryption region;
extracting encryption key associated information, which is information about an encryption key embedded in the image of the encryption region, from the restored image of the encryption region;
decrypting a decryption key, which is used to decrypt the image of the encryption region, from the encryption key associated information by using a first private key pairing with a first public key used to generate the encryption key associated information;
decrypting the original image by decrypting the image of the encryption region by using the decrypted decryption key; and
outputting the original image in a predetermined method.

22. The storage medium according to claim 21, wherein
the first private key is a private key that is possessed by a transmission destination of the encrypted image and used by another party, to which the transmission destination submits the encrypted image, to decrypt the encrypted image.

23. The storage medium according to claim 21, the process further comprising
obtaining a public key to obtain a second public key pairing with a second private key when the encryption key associated information is encrypted with the first public key and the second private key, wherein
the decrypting the decryption key decrypts the decryption key from the encryption key associated information by using the first private key and the second public key.

24. The storage medium according to claim 21, wherein:
each piece of encryption key associated information, which is included in an image of each of the plurality of encryption regions, is information about an individual encryption key;
the extracting the encryption key associated information extracts an individual piece of the encryption key associated information from each of the plurality of encryption regions; and
the decrypting the decryption key decrypts, from each piece of the encryption key associated information, each decryption key used to decrypt the image of each of the plurality of encryption regions, in which each piece of the encryption key associated information is embedded, by using a private key pairing with a public used to generate each piece of the encryption key associated information.

* * * * *

UNITED STATES PATENT AND TRADEMARK OFFICE
CERTIFICATE OF CORRECTION

PATENT NO. : 8,571,212 B2  
APPLICATION NO. : 12/623935  
DATED : October 29, 2013  
INVENTOR(S) : Anan et al.

It is certified that error appears in the above-identified patent and that said Letters Patent is hereby corrected as shown below:

On the Title Page, Item (56)  
On the Second Page, In Column 2, Line 11, delete "07797237.3-1903." and insert -- 07737237.3-1903. --, therefor Signed and Sealed this  
Twenty-fifth Day of March, 2014

Michelle K. Lee  
*Deputy Director of the United States Patent and Trademark Office*